United States Patent
Watanabe

(10) Patent No.: US 10,906,529 B2
(45) Date of Patent: Feb. 2, 2021

(54) CONTROL APPARATUS FOR FOUR-WHEEL-DRIVE VEHICLE

(71) Applicant: Toyota Jidosha Kabushiki Kaisha, Toyota (JP)

(72) Inventor: Ryochi Watanabe, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 159 days.

(21) Appl. No.: 16/227,051

(22) Filed: Dec. 20, 2018

(65) Prior Publication Data
US 2019/0202440 A1  Jul. 4, 2019

(30) Foreign Application Priority Data

Dec. 28, 2017  (JP) .................................. 2017-252883

(51) Int. Cl.
*B60W 30/02*  (2012.01)
*B60W 10/02*  (2006.01)
(Continued)

(52) U.S. Cl.
CPC ............ *B60W 30/02* (2013.01); *B60W 10/02* (2013.01); *B60W 10/12* (2013.01); *B60W 10/22* (2013.01);
(Continued)

(58) Field of Classification Search
CPC ...... B60W 30/02; B60W 10/02; B60W 10/12; B60W 10/22; B60W 40/114;
(Continued)

(56) References Cited

U.S. PATENT DOCUMENTS 6,208,920 B1 * 3/2001 Izawa .................. B60G 17/016
280/5.5
2007/0029127 A1   2/2007 Mori et al.
(Continued)

FOREIGN PATENT DOCUMENTS

JP    2007-045194 A    2/2007
JP    2009-096366 A    5/2009
(Continued)

OTHER PUBLICATIONS

U.S. Appl. No. 16/190,986, filed Nov. 14, 2018, Inventor: Ryochi Watanabe.

*Primary Examiner* — Aaron L Troost
(74) *Attorney, Agent, or Firm* — Dinsmore & Shohl LLP

(57) ABSTRACT

A control apparatus for a four-wheel-drive vehicle is configured to, during braking of the vehicle in a two-wheel-drive state, determine whether or not a degree of a yaw movement for deflecting the vehicle is larger than a predetermined first degree. When the degree of the yaw movement is larger than the first degree, the control apparatus increases a first coupling torque of a first coupling device and a second coupling torque of a second coupling device to a predetermined first torque value which is larger than zero, and controls a ground contact load adjusting device in such a manner that a first ground contact load at a rear wheel at an outer side with respect to the yaw movement becomes larger than a second ground contact load at a rear wheel at an inner side with respect to the yaw movement by a predetermined first load difference or more.

2 Claims, 7 Drawing Sheets

(51) Int. Cl.
  *B60W 40/114*  (2012.01)
  *B60W 10/22*  (2006.01)
  *B60W 10/12*  (2012.01)

(52) U.S. Cl.
  CPC ....... *B60W 40/114* (2013.01); *B60W 2400/00* (2013.01); *B60W 2510/0275* (2013.01); *B60W 2510/12* (2013.01); *B60W 2510/18* (2013.01); *B60W 2520/125* (2013.01); *B60W 2520/14* (2013.01); *B60W 2520/28* (2013.01); *B60W 2520/30* (2013.01); *B60W 2520/403* (2013.01); *B60W 2540/10* (2013.01); *B60W 2540/18* (2013.01); *B60W 2710/027* (2013.01); *B60W 2710/12* (2013.01); *B60W 2710/22* (2013.01); *B60W 2720/14* (2013.01)

(58) Field of Classification Search
  CPC ..... B60W 2400/00; B60W 2510/0275; B60W 2510/12; B60W 2510/18; B60W 2520/125; B60W 2520/14; B60W 2520/28; B60W 2520/30; B60W 2520/403; B60W 2540/10; B60W 2540/18; B60W 2710/027; B60W 2710/12; B60W 2710/22; B60W 2720/14
  See application file for complete search history.

(56) References Cited

U.S. PATENT DOCUMENTS

2010/0324780 A1  12/2010  Koumura et al.
2017/0113456 A1   4/2017  Maeda

FOREIGN PATENT DOCUMENTS

| JP | 2012-056394 A |   | 3/2012  |         |
| JP | 2012056394 A  | * | 3/2012  | ......... B60G 21/0555 |
| JP | 2015-224005 A |   | 12/2015 |         |
| WO | WO-2015181607 A1 | * | 12/2015 | ......... B60K 17/3515 |

* cited by examiner

FIG.2
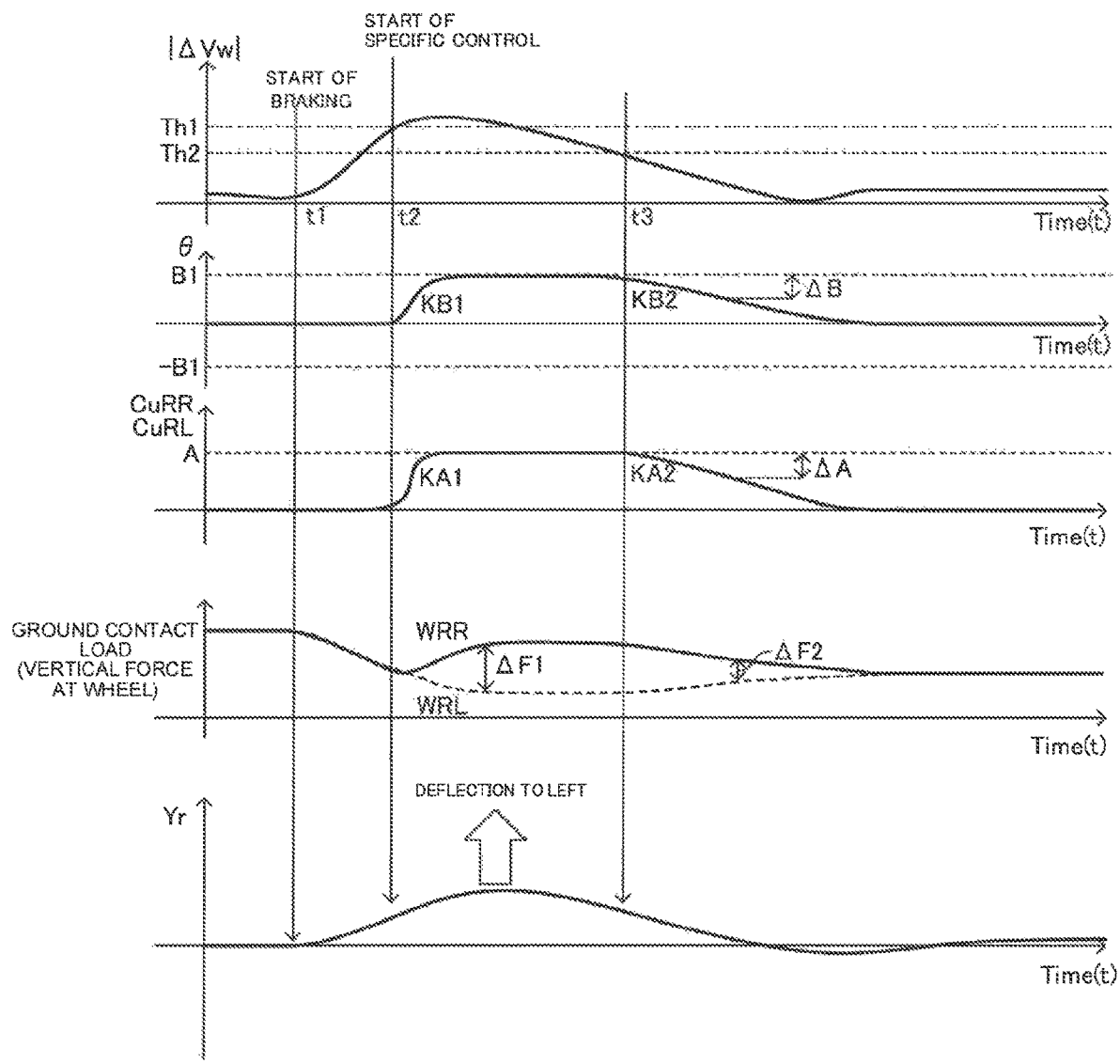
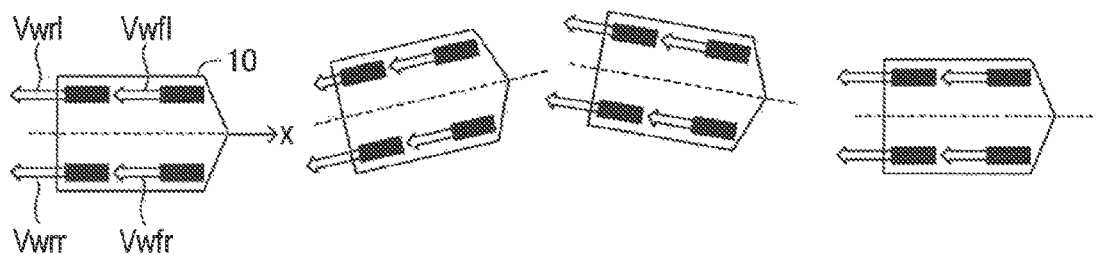

CONTROL APPARATUS FOR FOUR-WHEEL-DRIVE VEHICLE

CROSS-REFERENCE TO RELATED APPLICATION

The present application claims priority from Japanese patent application JP 2017-252883 filed on Dec. 28, 2017, the content of which is hereby incorporated by reference into this application.

BACKGROUND

1. Technical Field

The present disclosure relates to a control apparatus which is applied to a four-wheel-drive vehicle including a front wheel differential device configured to transmit a driving force generated by a driving device to left and right front wheels, a rear wheel final gear device configured to transmit the driving force to left and right rear wheels via coupling devices, and a mechanism configured to set a transmission state of the driving force from the driving device to the rear wheel final gear device to either a connection state or a disconnection state. Hereinafter, the four-wheel-drive vehicle is also simply referred to as a "vehicle".

2. Description of the Related Art

A conventionally known control apparatus (hereinafter, referred to as a "related-art apparatus") for the vehicle is configured to, when a yaw rate deviation is higher than a predetermined value while the vehicle goes straight in a two-wheel-drive state, couple a left rear wheel axle and a right rear wheel axle by a coupling device while maintaining the vehicle at the two-wheel-drive state (See Japanese Patent Application Laid-Open No. 2015-224005 A). Here, the yaw rate deviation is a deviation between a yaw rate value in an ideal state during straight traveling and the current yaw rate value.

When the yaw rate deviation is large, in general, a difference between a wheel speed of the left rear wheel and a wheel speed of the right rear wheel is large. Therefore, the related-art apparatus performs the above-mentioned coupling control to decrease the difference between the wheel speed of the left rear wheel and the wheel speed of the right rear wheel to thereby decrease the yaw rate deviation. As a result, the related-art apparatus can have the vehicle travel stably.

Meanwhile, in a situation in which the vehicle travels in an expressway, in order to improve fuel consumption, there are cases where the vehicle travels in the "two-wheel-drive state (that is, FF: Front-engine Front-drive) in which two front wheels are driving wheels". In such a situation in which the vehicle travels in the two-wheel-drive state, when a braking device applies a braking force to the wheels, a yaw movement for deflecting the vehicle to a right or left side may occur. When the yaw movement occurs, the related-art apparatus performs the above-mentioned coupling control to thereby decrease the difference between the wheel speed of the left rear wheel and the wheel speed of the right rear wheel to zero (or a small value close to zero). In this case, the vehicle is made to continue traveling in a direction in which the vehicle is facing/traveling at a time point at which the difference between the wheel speeds becomes substantially zero. That is, although the related-art apparatus performs the coupling control to suppress a further deflection of the vehicle, the related-art apparatus cannot generate a "yaw moment in a direction opposite to the yaw movement" for returning the traveling direction of vehicle to the original traveling direction (that is, the traveling direction before the deflection).

SUMMARY

One or more embodiments have been devised in view of the above-mentioned problem. Specifically, there is provided a control apparatus for the four-wheel-drive vehicle which can return the traveling direction of the vehicle to the original traveling direction when (or just before) the yaw movement for deflecting the vehicle to the left or right side has occurred during braking of the vehicle in the two-wheel-drive state.

According to one embodiment, there is provided a control apparatus for a four-wheel-drive vehicle (10), including:

a driving device (20) configured to generate a driving force;

a braking device (40) configured to apply a braking force to a left front wheel (WFL), a right front wheel (WFR), a left rear wheel (WRL) and a right rear wheel (WRR);

a front wheel differential device (31) configured to transmit the driving force to a left front wheel axle (32L) and a right front wheel axle (32R), and allow a differential between the left front wheel axle and the right front wheel axle;

a transfer gear device (33) configured to transmit the driving force to a propeller shaft (34);

a rear wheel final gear device (35) having a driving output part (353), and configured to transmit to the driving output part the driving force transmitted to the propeller shaft;

a first coupling device (361) configured to control a first coupling torque (CuRL) between the driving output part and a left rear wheel axle (38L) to change a transmission degree of the driving force to the left rear wheel axle;

a second coupling device (362) configured to control a second coupling torque (CuRR) between the driving output part and a right rear wheel axle (38R) to change a transmission degree of the driving force to the right rear wheel axle;

a mechanism (336 and 367) configured to selectively set a transmission state of the driving force transmitted from the driving device to the driving output part through the transfer gear device and the propeller shaft to either a connection state in which the driving force is transmitted to the driving output part, or a disconnection state in which the driving force is not transmitted to the driving output part; and a ground contact load adjusting device (90, 93L and 93R) configured to cause a difference between a ground contact load at the left rear wheel and a ground contact load at the right rear wheel.

The control apparatus further includes:

a detector (82, 83, 85 and 86) configured to detect traveling state information indicative of a current traveling state of the vehicle; and a controller (60) configured to, based on the traveling state information detected by the detector, control the first coupling torque and the second coupling torque, and control the ground contact load adjusting device.

In a case where the four-wheel-drive vehicle travels in a two-wheel-drive state of the left front wheel and the right front wheel by setting the transmission state of the driving force to the disconnection state, when the braking device applies the braking force to the left front wheel, the right front wheel, the left rear wheel and the right rear wheel, and the first coupling torque and the second coupling torque are both zero, the controller is configured to:

based on the traveling state information detected by the detector, determine whether or not a degree of a yaw movement for deflecting the vehicle to a left or right side due to the braking force is larger than a predetermined first degree (Step 605 or Step 701); and when the controller determines that the degree of the yaw movement is larger than the first degree (Step 605: Yes or Step 701: Yes), perform a yaw movement suppression control.

The yaw movement suppression control is a control (which is programmed, or which causes the controller to execute instructions) to increase the first coupling torque and the second coupling torque to a predetermined first torque value which is larger than zero while maintaining the transmission state of the driving force at the disconnection state (Step 606 and Step 607); and control the ground contact load adjusting device in such a manner that a first ground contact load at the rear wheel at an outer side with respect to the yaw movement becomes larger than a second ground contact load at the rear wheel at an inner side with respect to the yaw movement by a predetermined first load difference (ΔF1) or more (Step 608 and Step 609; or Step 702 and Step 609).

As described above, in the case where the four-wheel-drive vehicle travels in the two-wheel-drive state of the left front wheel and the right front wheel, when the degree of the "yaw movement for deflecting the vehicle to the left or right side due to the braking force" becomes large, the control apparatus increases the first coupling torque and the second coupling torque to the predetermined first torque value which is larger than zero, and controls the ground contact load adjusting device in such a manner that the first ground contact load at the rear wheel at the outer side with respect to (relative to) the yaw movement is larger than the second ground contact load at the rear wheel at the inner side with respect to (relative to) the yaw movement by the predetermined first load difference or more. Since the first coupling torque and the second coupling torque are increased, a difference between a wheel speed of the right rear wheel and a wheel speed of the left rear wheel gradually becomes small. Therefore, the control apparatus can suppress a further deflection of the vehicle. In parallel with the above control, the control apparatus controls the ground contact load adjusting device in such a manner that the first ground contact load becomes larger than the second ground contact load by the predetermined first load difference or more. In this manner, a braking force received from a road surface by the rear wheel of which the ground contact load is larger becomes larger than a braking force received from the road surface by the rear wheel of which the ground contact load is smaller. As a result, a yaw moment is generated in a direction where the rear wheel of which the braking force received from the road surface is larger is an inner side wheel. That is, the yaw moment is generated in a direction opposite to the yaw movement. Accordingly, by this yaw moment, the control apparatus can return the traveling direction of the vehicle to the original traveling direction before the deflection.

In an aspect of the control apparatus, the controller is configured to:

determine whether or not the degree of the yaw movement is decreased (suppressed) to a predetermined second degree which is smaller than the first degree and larger than zero during the yaw movement suppression control, based on the traveling state information (Step 605 or Step 701); and on and after the controller determines that the degree of the yaw movement is decreased to the second degree (Step 605: No or Step 701: No), gradually decrease a difference between the first ground contact load and the second ground contact load to zero (Step 615 and Step 617; or Step 616 and Step 617).

Furthermore, the controller is configured to change the difference between the first ground contact load and the second ground contact load in such a manner that a magnitude of change amount of the difference per unit time when gradually decreasing the difference to zero is smaller than a magnitude of change amount of the difference per unit time when increasing the difference to the first load difference.

The controller according to the above aspect gradually decreases, when it is determined that the degree of the yaw movement is decreased to the second degree which is smaller than the first degree, the difference between the first ground contact load and the second ground contact load toward zero. Therefore, after the yaw movement of the vehicle is decreased, the yaw moment in the direction opposite to the yaw movement gradually becomes small. Since the controller according to the present aspect can lower a possibility that the behavior of the vehicle is suddenly changed after the yaw movement of the vehicle is decreased, the vehicle can be made to smoothly face in the original traveling direction before the deflection.

Further, according to the present aspect, since the magnitude of change amount of the difference between the first ground contact load and the second ground contact load per unit time when increasing that difference to the first load difference is relatively large, the control apparatus can suppress the yaw movement of the vehicle generated due to the braking force in a rapid manner. Further, since the magnitude of change amount of the difference between the first ground contact load and the second ground contact load per unit time when gradually decreasing that difference to zero is relatively small, the vehicle can be made to smoothly face in the original traveling direction after the yaw movement of the vehicle is decreased to a certain degree.

In an aspect of the control apparatus, the controller is configured to gradually decrease the first coupling torque and the second coupling torque to zero (Step 612 and Step 613) on and after the controller determines that the degree of the yaw movement is decreased (suppressed) to the second degree (Step 605: No or Step 701: No).

Further, the controller is configured to change the first coupling torque and the second coupling torque in such a manner that a magnitude (KA2) of change amount of each coupling torque per unit time when gradually decreasing the first coupling torque and the second coupling torque to zero is smaller than a magnitude (KA1) of change amount of each coupling torque per unit time when increasing the first coupling torque and the second coupling torque to the first torque value.

The controller according to the above aspect gradually decreases the first coupling torque and the second coupling torque toward zero on and after the yaw movement of the vehicle is decreased to a certain degree by the yaw movement suppression control. Therefore, it is possible to lower a possibility that the behavior of the vehicle is suddenly changed after the yaw movement of the vehicle decreased. Further, the first coupling torque and the second coupling torque are decreased finally to zero to thereby release the coupling by the coupling devices between the left rear wheel and the right rear wheel. Therefore, since friction loss is lowered/avoided at the side of the rear wheels, fuel consumption of the vehicle can be improved.

Further, according to the present aspect, since the magnitude of change amount of each coupling torque per unit time when increasing the first coupling torque and the second coupling torque to the first torque value is relatively large, the control apparatus can decrease the difference between the wheel speed of the right rear wheel and the wheel speed of the left rear wheel in a rapid manner. Therefore, the control apparatus can suppress the yaw movement of the vehicle generated due to the braking force in a rapid manner. Further, according to the present aspect, the magnitude of change amount of each coupling torque per unit time when gradually decreasing the first coupling torque and the second coupling torque toward zero is relatively small. Even if the difference between the wheel speed of the right rear wheel and the wheel speed of the left rear wheel has not yet reached a value close to zero at a time point at which the degree of the yaw movement is decreased to the second degree, the control apparatus gradually lowers coupling force between the left rear wheel and the right rear wheel to thereby gradually bring the difference between the wheel speed of the right rear wheel and the wheel speed of the left rear wheel close to zero.

In the above description, in order to facilitate understanding of the above one or more aspect of the embodiment, a name and/or reference numeral used in embodiments described below is enclosed in parentheses and assigned to each of the constituent features corresponding to the embodiments. However, each of the constituent features is not limited to the embodiments defined by the name and/or reference numeral.

BRIEF DESCRIPTION OF THE DRAWINGS

FIG. 2 is a diagram for explaining an operation of a 4WD ECU according to the first embodiment in a case where the vehicle is deflected to the left side.

DETAILED DESCRIPTION

Now, referring to the accompanying drawings, a description is given of embodiments. The accompanying drawings are illustrations of one or more specific embodiments in conformity with the principle thereof, but those illustrations are examples to be used for the understanding of the embodiment(s), and are not to be used to limit the interpretation of the present disclosure.

First Embodiment

Figure 1:
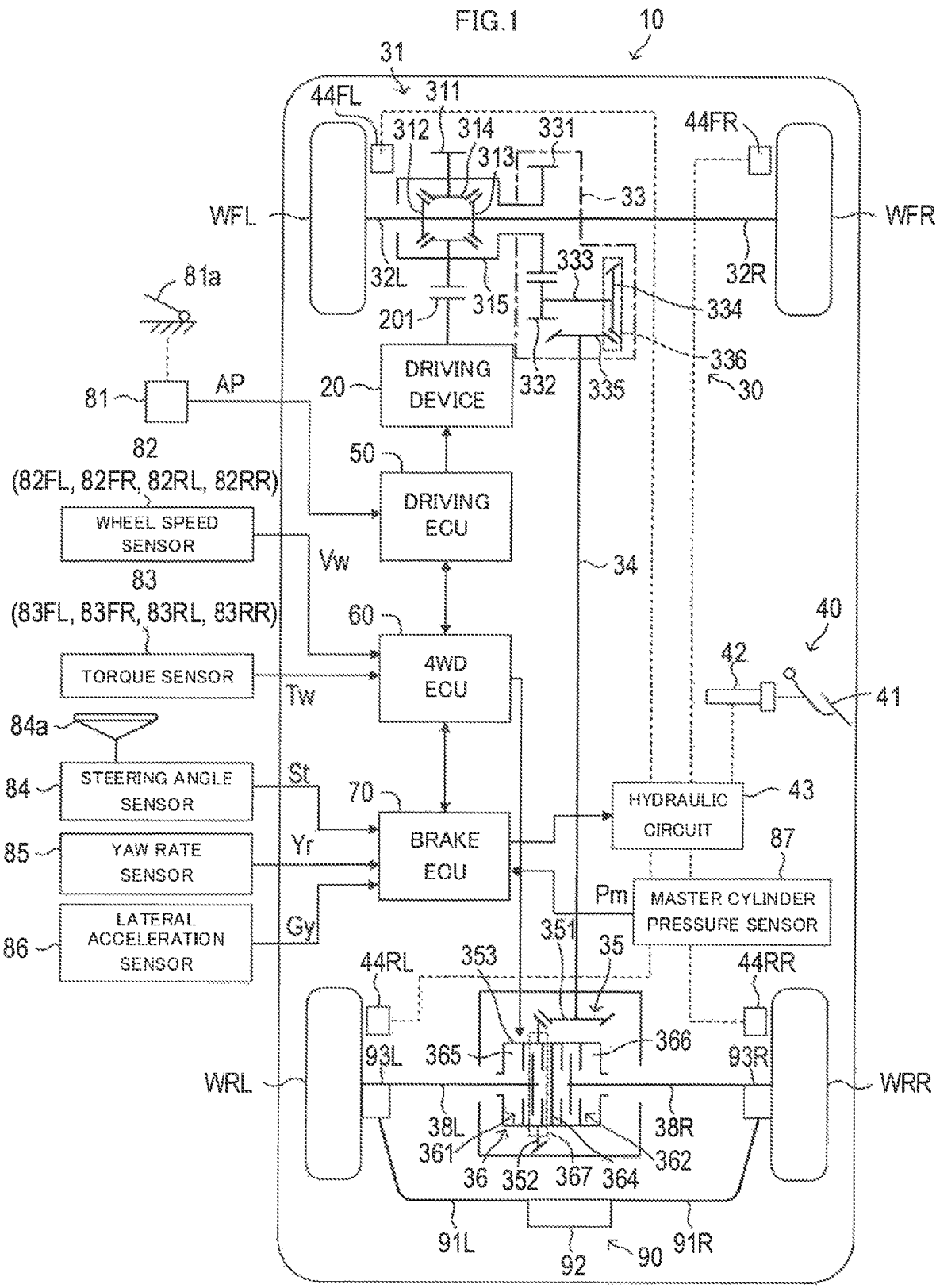
FIG. 1 is a schematic configuration diagram for illustrating a four-wheel-drive vehicle according to a first embodiment, and a control apparatus according to the first embodiment applied to the four-wheel-drive vehicle.

As illustrated in FIG. 1, a control apparatus (hereinafter, referred to as a "first apparatus") according to a first embodiment of the present disclosure is applied to a four-wheel-drive vehicle 10.

The vehicle 10 includes a driving device 20, a driving force transmitting device 30, a braking device 40, a driving ECU 50, a 4WD ECU 60, and a brake ECU 70. The driving ECU 50, the 4WD ECU 60 and the brake ECU 70 correspond to a part of the control apparatus according to the present disclosure. In addition, two or more ECUs among the above-mentioned ECUs may be integrated into one ECU.

Those ECUs are electric control units each including a microcomputer as a main part, and are connected to one another so as to be able to mutually transmit and receive information via a controller area network (CAN) (not shown). The microcomputer herein includes a CPU, a RAM, a ROM, an interface I/F, and the like. The CPU executes instructions (programs and routines) stored in the ROM to realize various functions described later.

The driving device 20 generates a driving force. The driving device 20 drives wheels of the vehicle 10 (a left front wheel WFL, a right front wheel WFR, a left rear wheel WRL and a right rear wheel WRR) through the driving force transmitting device 30. The driving device 20 includes a combination of an engine and a transmission for a typical vehicle. The driving device 20 may include any one of driving devices for vehicle which are well known in the art, such as a combination of an electric motor and a transmission, as well as a combination of an engine, an electric motor and a transmission.

The driving force transmitting device 30 includes a front wheel differential device 31, a left front wheel axle 32L, a right front wheel axle 32R, a transfer gear device 33, a propeller shaft 34, a rear wheel final gear device 35, a clutch device 36, a left rear wheel axle 38L, a right rear wheel axle 38R, and the like.

The front wheel differential device 31 includes a drive gear 311, a left side gear 312, a right side gear 313, a pinion gear 314, and a front differential case 315. The drive gear 311 engages with a transmission output gear 201 which outputs the driving force generated by the driving device 20. The left side gear 312 is directly coupled to the left front wheel axle 32L, and rotates integrally with the left front wheel axle 32L. The right side gear 313 is directly coupled to the right front wheel axle 32R and rotates integrally with the right front wheel axle 32R. The left side gear 312 and the right side gear 313 are coupled by the pinion gear 314. The front differential case 315 is directly coupled to the drive gear 311 and rotates integrally with the drive gear 311. Further, the front differential case 315 accommodates the left side gear 312, the right side gear 313, and the pinion gear 314. With such a configuration, the front wheel differential device 31 transmits the driving force generated by the driving device 20 to the left front wheel axle 32L and the right front wheel axle 32R, and distributes the driving force to the left front wheel axle 32L and the right front wheel axle 32R while allowing for differential between those front wheel axles.

The transfer gear device 33 includes an input gear 331, a counter gear 332, a counter shaft 333, a first ring gear 334, and a first pinion gear 335. The input gear 331 is directly coupled to the front differential case 315 and rotates integrally with the front differential case 315. The counter gear 332 engages with the input gear 331. One end of the counter shaft 333 is coupled to the counter gear 332, and the other end of the counter shaft 333 is coupled to the first ring gear 334. Therefore, the first ring gear 334 rotates integrally with the counter gear 332. The first pinion gear 335 engages with the first ring gear 334. The first pinion gear 335 is coupled to a front end of the propeller shaft 34 and rotates integrally with the propeller shaft 34. The first pinion gear 335 and the first ring gear 334 constitute a so-called hypoid gear in which the first pinion gear 335 engages with the first ring gear 334 in such a manner that an axial center of the first pinion gear 335 is offset from a rotation center of the first ring gear 334. With such a configuration, the transfer gear device 33 transmits the driving force to the rear wheel side via the propeller shaft 34.

The rear wheel final gear device 35 includes a second pinion gear 351, a second ring gear 352, a rear differential case 353, and the like. The second pinion gear 351 is coupled to a rear end of the propeller shaft 34 and rotates integrally with the propeller shaft 34. The second ring gear 352 engages with the second pinion gear 351. The rear differential case 353 is a cylindrical case arranged coaxially with the left rear wheel axle 38L and the right rear wheel axle 38R, and is directly coupled to the second ring gear 352. Therefore, the rear differential case 353 is configured to rotate integrally with the second ring gear 352 around the left rear wheel axle 38L and the right rear wheel axle 38R. The second pinion gear 351 and the second ring gear 352 constitute a hypoid gear. The rear differential case 353 will be also referred to as a "driving force output part". With such a configuration, the rear wheel final gear device 35 transmits the driving force from the propeller shaft 34 to the left rear wheel axle 38L and the right rear wheel axle 38R.

The clutch device 36 includes a first clutch 361 and a second clutch 362. The first clutch 361 is arranged between the rear wheel final gear device 35 and the left rear wheel axle 38L. The first clutch 361 controls a transmission torque between the rear differential case 353 and the left rear wheel axle 38L to change a transmission degree of the driving force to the left rear wheel axle 38L. The second clutch 362 is arranged between the rear wheel final gear device 35 and the right rear wheel axle 38R. The second clutch 362 controls a transmission torque between the rear differential case 353 and the right rear wheel axle 38R to change a transmission degree of the driving force to the right rear wheel axle 38R. The first clutch 361 and the second clutch 362 are independently-variable-control-type clutches configured to independently change the transmission torque in response to a command from the 4WD ECU 60, respectively. The above-mentioned transmission torque will be also referred to as a "coupling torque". Further, the first clutch 361 and the second clutch 362 are also referred to as a "first coupling device 361" and a "second coupling device 362", respectively. A partition wall 364 is provided at a central portion of the rear differential case 353 in an axial direction (left-right direction of the vehicle). A first clutch chamber 365 is formed on the left side of the vehicle with respect to the partition wall 364, and a second clutch chamber 366 is formed on the right side of the vehicle with respect to the partition wall 364. The first clutch 361 is accommodated in the first clutch chamber 365, and the second clutch 362 is accommodated in the second clutch chamber 366. The configuration of the clutch device 36 is well known as described in Japanese Patent Application Laid-Open No. 2007-45194 A, which is hereby incorporated by reference into this application. Each of the first clutch 361 and the second clutch 362 is a clutch in which a multiple disk type clutch and an electromagnetic clutch are combined.

Hereinafter, a state in which the driving force is transmitted to the rear wheel axles (38L and 38R) will be also referred to as a "first state". In other words, the first state is a state in which the coupling torques of the clutches (361 and 362) are set to a value larger than zero. Further, a state in which the driving force is not transmitted to the rear wheel axles (38L and 38R) will be also referred to as a "second state". In other words, the second state is a state in which the coupling torques of the clutches (361 and 362) are set to zero.

Further, the vehicle 10 further includes a disconnect mechanism. The disconnect mechanism is a mechanism configured to connect/disconnect, at an any point, a connection between the driving device 20 and the rear wheel final gear device 35 to switch the driving states of the vehicle 10 from a "four-wheel-drive enabled state (4WD-enabled state)" to a "two-wheel-drive state (2WD state)" or from the 2WD state to the 4WD-enabled state.

More specifically, the transfer gear device 33 further includes a third clutch 336 configured to selectively provide a connection/disconnection between the first ring gear 334 and the first pinion gear 335. Further, the rear wheel final gear device 35 further includes a fourth clutch 367 configured to selectively provide a connection/disconnection between the second ring gear 352 and the rear differential case 353. The third clutch 336 and the fourth clutch 367 correspond to the above-mentioned disconnect mechanism.

Hereinafter, the following state will be referred to as a "connection state": the third clutch 336 provides the connection between the first ring gear 334 and the first pinion gear 335, and the fourth clutch 367 provides the connection between the second ring gear 352 and the rear differential case 353. When the disconnect mechanism is in the connection state, the driving force from the driving device 20 is transmitted to the rear differential case (driving output part) 353 through the transfer gear device 33 and the propeller shaft 34.

Further, the following state will be referred to as a "disconnection state": the third clutch 336 provides the disconnection between the first ring gear 334 and the first pinion gear 335, and the fourth clutch 367 provides the disconnection between the second ring gear 352 and the rear differential case 353. When the disconnect mechanism is in the disconnection state, the driving force from the driving device 20 cannot be transmitted to the rear differential case (driving output part) 353.

It should be noted that the above-mentioned 4WD-enabled state means a state in which the vehicle 10 can be driven by the four-wheel-drive. Actually, when the first state is realized in the 4WD-enabled state, the vehicle 10 becomes the four-wheel-drive state (4WD state). That is, when the connection state is realized and the coupling torques of the clutches (361 and 362) are both set to be a torque capable of transmitting the driving force to the rear wheel axles (38L and 38R), an actual driving state of the vehicle 10 becomes the four-wheel drive state.

In addition, the driver can perform the switching between the "connection state" and the "disconnection state" through operating a state-switching switch (not shown). This state-switching switch is a dial-type switch configured to be operated (rotated) by the driver to switch the states of the vehicle 10 between the 4WD state and the 2WD state. The state-switching switch has a first position corresponding to the 4WD state and a second position corresponding to the 2WD state. The state-switching switch is configured to transmit (generate) an ON signal (high level signal) to the 4WD ECU 60 when it is disposed at the first position, and transmit (generate) an OFF signal (low level signal) to the 4WD ECU 60 when it is disposed at the second position. The 4WD ECU 60 receives the signal (ON or OFF signal) from the state-switching switch. The 4WD ECU 60 controls the third clutch 336 and the fourth clutch 367 in response to the signal from the state-switching switch.

Further, the vehicle 10 further includes a stabilizer device 90. The stabilizer device 90 includes a pair of bars 91L and 91R each extending in a vehicle-width direction of the vehicle 10, and an actuator 92 configured to relatively rotate the pair of bars 91L and 91R. The bars 91L and 91R are coupled to a suspension part 93L of the left rear wheel WRL and a suspension part 93R of the right rear wheel WRR, respectively. The actuator 92 includes an electric motor and a reduction gear.

The stabilizer device 90 relatively rotates the pair of bars 91L and 91R in response to a control signal from the 4WD ECU 60 to make/provide a difference between a ground contact load at the left rear wheel WRL and a ground contact load at the right rear wheel WRR. Here, the ground contact load means vertical force at the wheel, that is, the component in the vertical direction of force acting on a tire from a road surface. The structure of the above-mentioned stabilizer device is well known as described in Japanese Patent Application Laid-Open No. 2009-96366 A, which is hereby incorporated by reference into this application. The stabilizer device 90 may be implemented by any configuration known in the art as long as it can make/provide a difference between the ground contact load at the left rear wheel WRL and the ground contact load at the right rear wheel WRR.

Hereinafter, a relative rotation angle of the bars 91L and 91R from a neutral position is referred to as a "rotation angle θ of the stabilizer device 90". The neutral position of the bars 91L and 91R corresponds to a rotation position when the vehicle 10 is stopped in a horizontal posture and the electric motor of the actuator 92 is not energized. In the present embodiment, when the rotation angle θ is positive, the ground contact load at the right rear wheel WRR becomes larger than the ground contact load at the left rear wheel WRL. Meanwhile, when the rotation angle θ is negative, the ground contact load at the left rear wheel WRL becomes larger than the ground contact load at the right rear wheel WRR.

The braking device 40 includes a brake pedal 41, a master cylinder 42, a hydraulic circuit 43, wheel cylinders 44 (44FL, 44FR, 44RL and 44RR), and the like.

The braking force for each of the wheels (the left front wheel WFL, the right front wheel WFR, the left rear wheel WRL and the right rear wheel WRR) is controlled by controlling a braking pressure of the corresponding wheel cylinder (44FL, 44FR, 44RL and 44RR) by using the hydraulic circuit 43 of the braking device 40. The hydraulic circuit 43 includes a reservoir (not shown), an oil pump (not shown), various valve devices (not shown) and the like, and functions as a brake actuator.

The driving ECU 50 is electrically connected to the 4WD ECU 60 and the brake ECU 70, and is configured to mutually transmit and receive information via a controller area network (CAN). The driving ECU 50 is electrically connected to various sensors including an accelerator opening sensor 81, and is configured to receive output signals from those sensors. The accelerator opening sensor 81 is configured to generate an output signal indicative of a depression amount (hereinafter, also referred to an "accelerator opening") AP of an acceleration pedal 81a configured to be operated by the driver. The driving ECU 50 is electrically connected to the driving device 20. The driving ECU 50 is configured to transmit various signals for controlling the driving device 20 based on the depression amount AP of the acceleration pedal 81a and an operation state of a shift lever (not shown).

The 4WD ECU 60 is electrically connected to wheel speed sensors 82 (82FL, 82FR, 82RL and 82RR) and torque sensors 83 (83FL, 83FR, 83RL and 83RR), and is configured to receive output signals from those sensors. Although not illustrated in FIG. 1, the 4WD ECU 60 is also electrically connected to a steering angle sensor 84, a yaw rate sensor 85 and a lateral acceleration sensor 86, and is configured to receive output signals from those sensors.

Each of the wheel speed sensors 82 is configured to generate one pulse each time the corresponding wheel rotates by a predetermined angle. The 4WD ECU 60 counts the number of pulses generated by the wheel speed sensor 82 per unit time to calculate a speed (that is, wheel speed) of the wheel provided with that wheel speed sensor 82 based on the counted value. More specifically, the 4WD ECU 60 calculates the wheel speed Vw based on the following Expression (1). In Expression (1), "r" is a dynamic radius of the wheel, "w" is an angular velocity of the wheel, "N" is the number of teeth of a rotor (number of pulses generated per rotation of the rotor), "Ni" is the number of pulses counted per unit time (measurement time) ΔT.

$$Vw = r \cdot \omega = r \cdot (2 \cdot \pi / N) \cdot (Ni / \Delta T) \tag{1}$$

In the above manner, the 4WD ECU 60 is configured to acquire a wheel speed Vwfl of the left front wheel WFL, a wheel speed Vwfr of the right front wheel WFR, a wheel speed Vwrl of the left rear wheel WRL, and a wheel speed Vwrr of the right rear wheel WRR.

Each of the torque sensors 83 (83FL, 83FR, 83RL and 83RR) generates an output signal indicative of a driving torque (Twfl, Twfr, Twrl and Twrr) acting on the corresponding wheel axle (the left front wheel axle 32L, the right front wheel axle 32R, the left rear wheel axle 38L and the right rear wheel axle 38R). Hereinafter, those driving torques are also collectively referred to as a "driving torque Tw".

The steering angle sensor 84 is configured to generate an output signal indicative of a steering angle St of a steering wheel 84a configured to be operated by the driver. The yaw rate sensor 85 is configured to generate an output signal indicative of a yaw rate Yr of the vehicle 10. The lateral acceleration sensor 86 is configured to generate an output signal indicative of a lateral acceleration Gy of the vehicle 100. The master cylinder pressure sensor 87 is configured to generate an output signal indicative of a master cylinder pressure Pm. In addition, the steering angle sensor 84, the yaw rate sensor 85 and the lateral acceleration sensor 86 detect the steering angle St, the yaw rate Yr and the lateral acceleration Gy, respectively, in such a manner that each of the sensors generates a positive value when the vehicle is turning left.

The 4WD ECU 60 is electrically connected to the rear wheel final gear device 35 and the clutch device 36. The 4WD ECU 60 controls the coupling torque of the first clutch 361 and the coupling torque of the second clutch 362 based on the accelerator opening AP, the wheel speeds Vwfl, Vwfr, Vwrl and Vwrr, and the like. Further, the 4WD ECU 60 is electrically connected to the actuator 92 of the stabilizer device 90. The 4WD ECU 60 controls the actuator 92 based on the wheel speeds Vwfl, Vwfr, Vwrl and Vwrr, the yaw rate Yr, and the like.

The brake ECU 70 is electrically connected to the steering angle sensor 84, the yaw rate sensor 85, the lateral acceleration sensor 86, the master cylinder pressure sensor 87, and the like. The brake ECU 70 is configured to receive output signals from those sensors.

Further, the brake ECU 70 calculates, based on the master cylinder pressure Pm, a target braking force Fbflt of the left front wheel WFL, a target braking force Fbfrt of the right front wheel WFR, a target braking force Fbrlt of the left rear wheel WRL, and a target braking force Fbrrt of the right rear wheel WRR. The brake ECU 70 controls a braking pressure of the wheel cylinder (44FL, 44FR, 44RL and 44RR) corresponding to each wheel in such a manner that an actual braking force of each wheel matches up with (becomes equal to) the corresponding target braking force.

Hereinafter, information on the current traveling state of the vehicle 10 such as the wheel speed Vw, the driving torque Tw, the yaw rate Yr, the lateral acceleration Gy and the steering angle St will be also referred to as "traveling state information".

<Operation of First Apparatus>

An operation of the first apparatus will next be described. When the vehicle 10 is traveling in the 2WD state (that is, the disconnect mechanism is in the "disconnection state") and the vehicle 10 is being braked, the first apparatus sets the coupling torque of the first clutch 361 and the coupling torque of the second clutch 362 to zero. In such a situation, when a degree of a yaw movement for deflecting the vehicle 10 to the left or right side is increased due to the braking force applied to each wheel of the vehicle 10, the first apparatus controls the coupling torque of the first clutch 361 and the coupling torque of the second clutch 362, and controls the stabilizer device 90. In this manner, the first apparatus generates a yaw moment in a direction opposite to the yaw movement. Therefore, the vehicle 10 can be made to face in the original traveling direction (traveling direction of the vehicle 10 before the deflection).

The above-mentioned control for generating the above-described yaw moment will be also referred to as a "yaw movement suppression control" or a "specific control". The specific control is performed in a situation in which the vehicle 10 goes substantially straight ahead in the 2WD state and the braking force is applied to the front wheels (WFL and WFR) and the rear wheels (WRL and WRR) by the braking device 40. In the present embodiment, when the driver operates the steering wheel 84a to turn the vehicle 10, the first apparatus does not forcibly generate the yaw moment independently of the driver's steering operation. Therefore, when the vehicle 10 is turning, the specific control described above is not performed.

Next, with reference to an example illustrated in FIG. 2, the specific control will be described in a situation in which the vehicle 10 is deflected to the left side. In the example illustrated in FIG. 2, the vehicle 10 goes straight in a direction X in the 2WD state before time t1. At time t1, the driver operates the brake pedal 41. This operation causes the braking device 40 to apply the braking force to the front wheels (WFL and WFR) and the rear wheels (WRL and WRR). At this time point, the first clutch 361 and the second clutch 362 are in the second state. That is, a first coupling torque CuRL of the first clutch 361 and a second coupling torque CuRR of the second clutch 362 are both zero.

Every time a predetermined period of time elapses, the 4WD ECU 60 calculates a difference ΔVw (=Vwrr−Vwrl) between the wheel speed Vwrr of the right rear wheel WRR and the wheel speed Vwrl of the left rear wheel WRL. The 4WD ECU 60 determines whether or not an absolute value of the difference ΔVw is equal to or larger than a predetermined first threshold Th1. In the example illustrated in FIG. 2, at time t2, the absolute value of the difference ΔVw becomes equal to or larger than the first threshold Th1. Further, the difference ΔVw is a positive value. In this case, since the wheel speed Vwrl of the left rear wheel WRL is lower than the wheel speed Vwrr of the right rear wheel WRR, the vehicle 10 is being deflected to the left side with respect to the direction X. Further, it is considered that the degree of deflection to the left side of the vehicle 10 is larger than a predetermined degree (hereinafter, referred to as a "first degree") because the difference ΔVw has become relatively large. Therefore, the 4WD ECU 60 starts to perform the specific control (yaw movement suppression control).

More specifically, the 4WD ECU 60 changes/transits both of the first clutch 361 and the second clutch 362 from the second state to the first state while having the vehicle 10 travel in the 2WD state (that is, while maintaining the disconnection state). The 4WD ECU 60 sets an instruction value (target value) C1 of the first coupling torque CuRL of the first clutch 361 and an instruction value (target value) C2 of the second coupling torque CuRR of the second clutch 362 to a predetermined torque value A (first torque value) which is larger than zero, to thereby change/transit the first clutch 361 and the second clutch 362 from the second state to the first state. For example, the torque value A is the maximum value of the coupling torque, or a value close to that maximum value. As illustrated in FIG. 2, the 4WD ECU 60 gradually (continuously) increases the first coupling torque CuRL of the first clutch 361 and the second coupling torque CuRR of the second clutch 362 in such a manner that the first coupling torque CuRL and the second coupling torque CuRR become equal to the predetermined torque value A. Here, a magnitude of change amount of each of the first coupling torque CuRL and the second coupling torque CuRR per unit time is "KA1".

Figure 3:
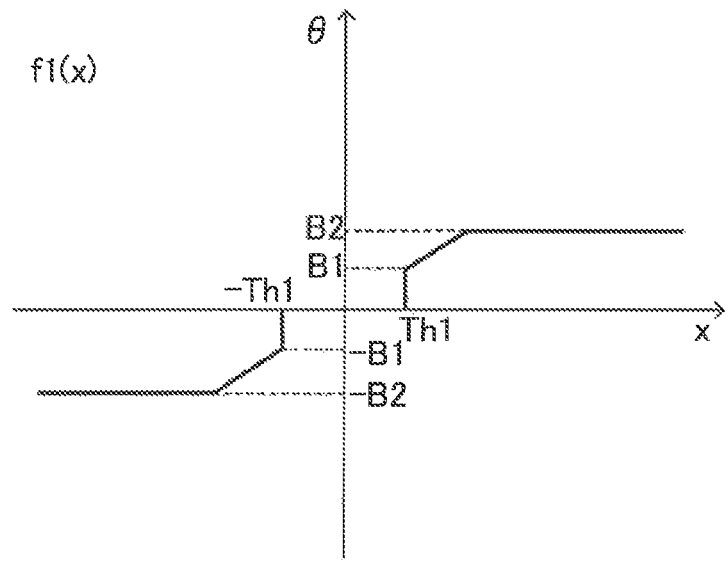
FIG. 3 is a graph of a function f1(x) representing a relationship between (i) a difference ΔVw (=Vwrr−Vwrl) between a wheel speed Vwrr of a right rear wheel and a wheel speed Vwrl of a left rear wheel, and (ii) an instruction value of a rotation angle θ of a stabilizer device.

Further, as the specific control is started, the 4WD ECU 60 sets an instruction value (target value) R1 of the rotation angle θ of the stabilizer device 90 to a predetermined rotation angle B1 (first rotation angle) which is larger than zero. More specifically, the 4WD ECU 60 determines the instruction value R1 of the rotation angle θ of the stabilizer device 90 through substituting the difference ΔVw into a variable x of a function f1(x) shown in FIG. 3. The function f1(x) is a function representing a relationship between the difference ΔVw and the instruction value of the rotation angle θ of the stabilizer device 90. As shown in FIG. 3, when the difference ΔVw is equal to or larger than Th1, the instruction value R1 of the rotation angle θ of the stabilizer device 90 is set to a positive value. That is, the instruction value R1 of the rotation angle θ of the stabilizer device 90 is set in such a manner that the ground contact load of the wheel at the outer side with respect to a direction of the yaw movement (the rear wheel at an opposite side to the direction of the yaw movement, that is, the rear right wheel WRR) becomes larger than the ground contact load of the wheel at the inner side with respect to the direction of the yaw movement (rear wheel at the same side as the direction of the yaw movement, that is, the left rear wheel WRL). Hereinafter, the ground contact load of the rear wheel at the outer side with respect to the direction of the yaw movement is also referred to as a "first ground contact load", and the ground contact load of the rear wheel at the inner side with respect to the direction of the yaw movement is also referred to as a "second ground contact load". In the present example, the instruction value R1 of the rotation angle θ of the stabilizer device 90 is set to the predetermined rotation angle B1. In addition, as illustrated in FIG. 3, in the case where the difference ΔVw is equal to or larger than the first threshold Th1, as the difference ΔVw becomes larger, the instruction value R1 of the rotation angle θ of the stabilizer device 90 becomes larger. The rotation angle B2 shown in FIG. 3 is an upper limit value (upper guard value) of the instruction value R1 in the specific control. The rotation angle B2 may be the maximum value of the rotation angle θ of the stabilizer device 90.

The 4WD ECU 60 gradually (continuously) increases the rotation angle θ of the stabilizer device 90 in such a manner that the rotation angle θ of the stabilizer device 90 becomes equal to the predetermined rotation angle B1. That is, the 4WD ECU 60 controls the rotation angle θ of the stabilizer device 90 in such a manner that the first ground contact load becomes larger than the second ground contact load by a predetermined first load difference ΔF1 (ΔF1 is a variable value) or more. In this control, a magnitude of change amount of the rotation angle θ per unit time is "KB1". In this manner, the "yaw moment in the direction opposite to the yaw movement" can be generated. This is due to the following reason.

Figure 4:
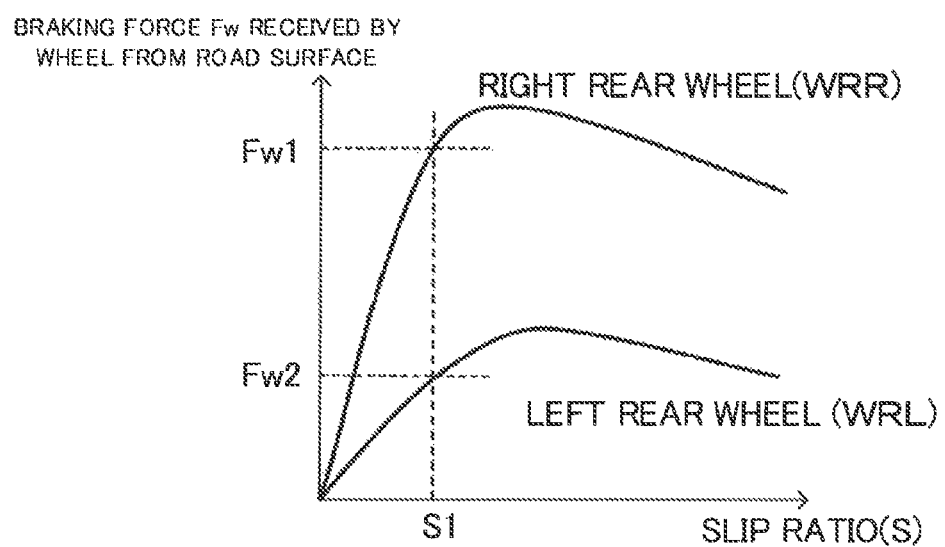
FIG. 4 is a graph representing a "relationship between a slip ratio S and a braking force (reaction force) Fw received by a wheel from a road surface" when the rotation angle θ of the stabilizer device is a predetermined rotation angle B1.

FIG. 4 illustrates a graph representing a "relationship between a slip ratio S and a braking force (reaction force) Fw received by the wheel from a road surface" when the rotation angle θ of the stabilizer device 90 is the predetermined rotation angle B1. Here, the slip ratio S is a value obtained through dividing a difference between a vehicle body speed and a wheel speed by the vehicle body speed. With the above control of the coupling torques CuRL and CuRR, the absolute value of the difference ΔVw is gradually decreased. That is, the slip ratio of the right rear wheel WRR and the slip ratio of the left rear wheel WRL approach the same value. In the example shown in FIG. 4, it is assumed that both of the slip ratio of the right rear wheel WRR and the slip ratio of the left rear wheel WRL approach the slip ratio S1. In this case, a braking force Fw1 received from the road surface by the right rear wheel WRR of which ground contact load is relatively large is larger than a braking force Fw2 received from the road surface by the left rear wheel WRL of which ground contact road is relatively small. Further, a difference between the braking force Fw1 and the braking force Fw2 is large. As described above, when the difference between the braking force Fw1 and the braking force Fw2 becomes larger than a predetermined degree, a yaw moment is generated in a direction such that the rear wheel (that is, the right rear wheel WRR) of which the braking force received from the road surface is larger is an inner side wheel (that is, in the same direction as the clockwise turning in plan view). In this manner, the yaw moment in the direction opposite to the yaw movement for deflecting the vehicle 10 to the left side can be generated.

After the above specific control is started, the 4WD ECU 60 calculates the difference ΔVw every time the predetermined period of time elapses. The 4WD ECU 60 determines whether or not the absolute value of the difference ΔVw becomes smaller than a predetermined second threshold Th2. The second threshold Th2 is a value smaller than the first threshold Th1, and is a threshold for determining that the degree of the yaw movement is suppressed/decreased to a predetermined second degree which is smaller than the first degree. In the example illustrated in FIG. 2, at time t3, the absolute value of the difference ΔVw becomes smaller than the second threshold Th2. This means that the degree of the yaw movement to the left side is suppressed to the second degree, that is, the vehicle 10 is gradually facing the original traveling direction X (traveling direction of the vehicle 10 before the deflection). Therefore, at time t3, the 4WD ECU 60 sets the instruction value C1 of the first coupling torque CuRL of the first clutch 361 and the instruction value C2 of the second coupling torque CuRR of the second clutch 362 to a predetermined torque value (second torque value) which is equal to or larger than zero, and is smaller than the torque value A. In the present example, the 4WD ECU 60 sets the instruction values C1 and C2 to a value (A−ΔA) as the second torque value. ΔA is a predetermined amount of reduction of the coupling torque, and is a positive value sufficiently smaller than the value A.

In the example shown in FIG. 2, the 4WD ECU 60 gradually (continuously) decreases the first coupling torque CuRL of the first clutch 361 and the second coupling torque CuRR of the second clutch 362 in such a manner that the first coupling torque CuRL and the second coupling torque CuRR become equal to "A− ΔA", respectively.

Further, when the absolute value of the difference ΔVw becomes smaller than the predetermined second threshold Th2, the 4WD ECU 60 sets the instruction value R1 of the rotation angle θ of the stabilizer device 90 to a predetermined rotation angle (second rotation angle) which is equal to or larger than zero, and is smaller than the rotation angle B1. In the present example, the 4WD ECU 60 sets the instruction value R1 to a value (B1−ΔB) as the second rotation angle. ΔB is a predetermined amount of change of the rotation angle, and is a positive value sufficiently smaller than the value B1.

In the example shown in FIG. 2, the 4WD ECU 60 gradually (continuously) decreases the rotation angle θ of the stabilizer device 90 in such a manner that the rotation angle θ becomes equal to "B1−ΔB". That is, the 4WD ECU 60 decreases a difference between the first ground contact load and the second ground contact load to a predetermined second load difference ΔF2 which is equal to or larger than zero, and is smaller than the first load difference ΔF1. This is due to the following reason. When the degree of the deflection of the vehicle 10 is suppressed to the second degree, if the difference between the first ground contact load and the second ground contact load is maintained at the first load difference ΔF1, there is a possibility that the behavior of the vehicle 10 is greatly changed (that is, the vehicle 10 is rapidly deflected to the right side). Therefore, the first apparatus gradually decreases the rotation angle θ of the stabilizer device 90. In this manner, the yaw moment in the direction opposite to the yaw movement is gradually decreased. Accordingly, the first apparatus can smoothly face the vehicle 10 in the original traveling direction X while suppressing a large change in the behavior of the vehicle 10 (deflection of the vehicle 10 to the right side).

In some embodiments, a "magnitude of change amount of the difference between the first ground contact load and the second ground contact load per unit time when decreasing that difference to the second load difference ΔF2" is smaller than a "magnitude of change amount of the difference between the first ground contact load and the second ground contact load per unit time when increasing that difference to the first load difference ΔF1". That is, the 4WD ECU 60 changes the rotation angle θ of the stabilizer device 90 in such a manner that the magnitude KB2 of change amount of the rotation angle θ per unit time when decreasing the rotation angle θ to "B1–ΔB" becomes smaller than the magnitude KB1 of change amount of the rotation angle θ per unit time when increasing the rotation angle θ to "B1". This is due to the following reason. In the case where the deflection to the left side of the vehicle 10 occurs, it is desirable that the deflection be suppressed in a shorter time. Therefore, the first apparatus sets the magnitude KB1 of change amount of the rotation angle θ per unit time to a relatively large value to thereby increase the rotation angle θ to "B1" in a short time. On the other hand, if the rotation angle θ is suddenly decreased after the degree of the deflection to the left side of the vehicle 10 is suppressed to the second degree, the "yaw moment in the direction opposite to the yaw movement" is also suddenly decreased. At time t3, since the difference ΔVw has not yet become zero, if the yaw moment becomes too small, there is possibility that the traveling direction of the vehicle 10 cannot be returned to the original traveling direction X. Therefore, the first apparatus sets the magnitude KB2 of change amount of the rotation angle θ per unit time to a relatively small value. Accordingly, the vehicle 10 can be made to gradually face in the original traveling direction X.

In some embodiments, a magnitude KA2 of change amount of each of the coupling torques CuRL and CuRR per unit time when decreasing the coupling torques CuRL and CuRR to "A– ΔA" is smaller than a magnitude KA1 of change amount of each of the coupling torques CuRL and CuRR per unit time when increasing the coupling torques CuRL and CuRR to "A". This is due to the following reason. In the case where the deflection to the left side of the vehicle 10 occurs, it is desirable that the difference ΔVw be decreased in a shorter time. Therefore, the first apparatus sets the magnitude KA1 of change amount of the coupling torque per unit time to a relatively large value to thereby increase the coupling torques CuRL and CuRR to "A" in a short time. On the other hand, although the difference ΔVw tends to be decreased at the time point (time t3) at which the deflection to the left side of the vehicle 10 is suppressed to the second degree, the difference ΔVw may not have reached near zero in some cases. If the coupling torques CuRL and CuRR are suddenly decreased, there is a possibility that the difference ΔVw does not reach zero, and therefore, the first apparatus cannot return the traveling direction of the vehicle 10 to the original traveling direction X. Therefore, the first apparatus sets the magnitude KA2 of change amount of the coupling torque per unit time to a relatively small value. In this manner, the first apparatus maintains the coupling between the left rear wheel WRL and the right rear wheel WRR for a certain time period even after the deflection of the vehicle 10 is suppressed to the second degree, and therefore, the first apparatus can gradually bring the difference ΔVw closer to zero. Finally, the coupling between the left rear wheel WRL and the right rear wheel WRR by using the first clutch 361 and the second clutch 362 is released.

Therefore, friction loss at the side of the rear wheels is reduced, and fuel consumption of the vehicle 10 can be improved.

Every time the predetermined period of time elapses, the 4WD ECU 60 decreases the instruction value C1 of the first coupling torque CuRL of the first clutch 361 and the instruction value C2 of the second coupling torque CuRR of the second clutch 362 by "ΔA". When the instruction values C1 and C2 become smaller than zero, the 4WD ECU 60 sets both of the instruction value C1 of the first coupling torque CuRL and the instruction value C2 of the second coupling torque CuRR to zero. The 4WD ECU 60 gradually decreases the first coupling torque CuRL of the first clutch 361 and the second coupling torque CuRR of the second clutch 362 toward zero to thereby change/transit the first clutch 361 and the second clutch 362 from the first state to the second state finally.

Further, every time the predetermined period of time elapses, the 4WD ECU 60 decreases the instruction value R1 of the rotation angle θ of the stabilizer device 90 by "ΔB". When the instruction value R1 becomes smaller than zero, the 4WD ECU 60 sets the instruction value R1 to zero. The 4WD ECU 60 gradually decreases the rotation angle θ of the stabilizer device 90 toward zero to thereby change/transit the rotation angle θ to zero finally. Alternatively, at the earlier point of the time point at which the instruction value R1 becomes smaller than "0" and the time point at which the instruction values C1 and C2 become smaller than "0", the 4WD ECU 60 may set the instruction value R1 to "0".

Next, with reference to an example illustrated in FIG. 5, the specific control will next be described in a situation in which the vehicle 10 is deflected to the right side. In the example illustrated in FIG. 3, the vehicle 10 goes straight in the direction X in the 2WD state before time t1. At time t1, the driver operates the brake pedal 41. This operation causes the braking device 40 to apply the braking force to the front wheels (WFL and WFR) and the rear wheels (WRL and WRR). At this time point, the first clutch 361 and the second clutch 362 are in the second state. That is, the first coupling torque CuRL of the first clutch 361 and the second coupling torque CuRR of the second clutch 362 are both zero.

Every time the predetermined period of time elapses, the 4WD ECU 60 calculates the difference ΔVw between the wheel speed Vwrr of the right rear wheel WRR and the wheel speed Vwrl of the left rear wheel WRL. The 4WD ECU 60 determines whether or not the absolute value of the difference ΔVw is equal to or larger than the predetermined first threshold Th1. In the example illustrated in FIG. 5, at time t2, the absolute value of the difference ΔVw becomes equal to or larger than the first threshold Th1. Further, the difference ΔVw is a negative value. In this case, since the wheel speed Vwrr of the right rear wheel WRR is lower than the wheel speed Vwrl of the left rear wheel WRL, the vehicle 10 is being deflected to the right side with respect to the direction X. The 4WD ECU 60 determines that the degree of the yaw movement for deflecting the vehicle 10 to the right side is larger than the predetermined first degree. Therefore, the 4WD ECU 60 starts to perform the specific control (yaw movement suppression control).

More specifically, the 4WD ECU 60 changes/transits both of the first clutch 361 and the second clutch 362 from the second state to the first state while having the vehicle 10 travel in the 2WD state (that is, while maintaining at the disconnection state). The 4WD ECU 60 sets the instruction value C1 of the first coupling torque CuRL of the first clutch 361 and the instruction value C2 of the second coupling torque CuRR of the second clutch 362 to the predetermined torque value A to thereby change/transit the first clutch 361 and the second clutch 362 from the second state to the first state. The 4WD ECU 60 gradually (continuously) increases the first coupling torque CuRL of the first clutch 361 and the second coupling torque CuRR of the second clutch 362 in such a manner that the first coupling torque CuRL and the second coupling torque CuRR become equal to the predetermined torque value A.

Further, as the specific control is started, the 4WD ECU 60 sets the instruction value (target value) R1 of the rotation angle $\theta$ of the stabilizer device 90 to a predetermined rotation angle "−B1" (third rotation angle) which is smaller than zero. More specifically, the 4WD ECU 60 determines the instruction value R1 of the rotation angle $\theta$ of the stabilizer device 90 through substituting the difference $\Delta$Vw into the variable x in the function f1(x) shown in FIG. 3. As illustrated in FIG. 3, when the difference $\Delta$Vw is smaller than "−Th1", the instruction value R1 of the rotation angle $\theta$ of the stabilizer device 90 is set to a negative value. That is, the instruction value R1 of the rotation angle $\theta$ of the stabilizer device 90 is set in such manner that the first ground contact load which is a ground contact load of the wheel (that is, the left rear wheel WRL) at the outer side with respect to (relative to) the direction of the yaw movement becomes larger than the second ground contact load which is a ground contact load of the wheel (that is, the right rear wheel WRR) at the inner side with respect to (relative to) the direction of the yaw movement. In the present example, the instruction value R1 of the rotation angle $\theta$ of the stabilizer device 90 is set to the predetermined rotation angle "−B1". In addition, the rotation angle "−B2" is a lower limit value (lower guard value) of the instruction value R1 in the specific control. The rotation angle "−B2" may be the minimum value of the rotation angle $\theta$ of the stabilizer device 90.

The 4WD ECU 60 gradually (continuously) decreases the rotation angle $\theta$ of the stabilizer device 90 in such a manner that the rotation angle $\theta$ of the stabilizer device 90 becomes equal to the predetermined rotation angle "−B1". That is, the 4WD ECU 60 controls the rotation angle $\theta$ of the stabilizer device 90 in such a manner that the first ground contact load becomes equal to or larger than the second ground contact load by the predetermined load difference $\Delta$F1. In this manner, the yaw moment is generated in the direction where the rear wheel (that is, the left rear wheel WRL) of which the braking force received from the road surface is larger is the inner side wheel as described above. That is, the yaw moment in the direction opposite to the yaw movement for deflecting the vehicle to the right side can be generated.

After the above specific control is started, the 4WD ECU 60 calculates the difference $\Delta$Vw every time the predetermined period of time elapses. The 4WD ECU 60 determines whether or not the absolute value of the difference $\Delta$Vw becomes smaller than the predetermined second threshold Th2. In the example illustrated in FIG. 5, at time t3, the absolute value of the difference $\Delta$Vw becomes smaller than the second threshold Th2. Therefore, the 4WD ECU 60 determines that the degree of the yaw movement to the right side is suppressed to the second degree. At time t3, the 4WD ECU 60 sets the instruction value C1 of the first coupling torque CuRL of the first clutch 361 and the instruction value C2 of the second coupling torque CuRR of the second clutch 362 to the second torque value (A− $\Delta$A). The 4WD ECU 60 gradually (continuously) decreases the first coupling torque CuRL of the first clutch 361 and the second coupling torque CuRR of the second clutch 362 in such a manner that the first coupling torque CuRL and the second coupling torque CuRR become equal to "A− $\Delta$A", respectively.

Further, when the absolute value of the difference $\Delta$Vw becomes smaller than the predetermined second threshold Th2, the 4WD ECU 60 sets the instruction value R1 of the rotation angle $\theta$ of the stabilizer device 90 to a predetermined rotation angle (fourth rotation angle) which is equal to or smaller than zero, and is larger than the rotation angle "−B1". In the present example, the 4WD ECU 60 sets the instruction value R1 to a value "−B1+$\Delta$B" as the fourth rotation angle. The 4WD ECU 60 gradually (continuously) increases the rotation angle $\theta$ of the stabilizer device 90 in such a manner that the rotation angle $\theta$ becomes equal to "−B1+$\Delta$B". That is, the 4WD ECU 60 decreases the difference between the first ground contact load and the second ground contact load to the predetermined second load difference $\Delta$F2 which is equal to or larger than zero, and is smaller than the first load difference $\Delta$F1.

Every time the predetermined period of time elapses, the 4WD ECU 60 decreases the instruction value C1 of the first coupling torque CuRL of the first clutch 361 and the instruction value C2 of the second coupling torque CuRR of the second clutch 362 by "$\Delta$A". When the instruction values C1 and C2 become smaller than zero, the 4WD ECU 60 sets both of the instruction value C1 of the first coupling torque CuRL and the instruction value C2 of the second coupling torque CuRR to zero. The 4WD ECU 60 gradually decreases the first coupling torque CuRL of the first clutch 361 and the second coupling torque CuRR of the second clutch 362 toward zero to thereby change/transit the first clutch 361 and the second clutch 362 from the first state to the second state finally.

Further, every time the predetermined period of time elapses, the 4WD ECU 60 increases the instruction value R1 of the rotation angle $\theta$ of the stabilizer device 90 by "$\Delta$B". When the instruction value R1 becomes larger than zero, the 4WD ECU 60 sets the instruction value R1 to zero. The 4WD ECU 60 gradually increases the rotation angle $\theta$ of the stabilizer device 90 to thereby change/transit the rotation angle $\theta$ to zero finally. Alternatively, at the earlier point of the time point at which the instruction value R1 becomes larger than "0" and the time point at which the instruction values C1 and C2 become smaller than "0", the 4WD ECU 60 may set the instruction value R1 to "0".

In some embodiments, the magnitude of change amount of the difference between the first ground contact load and the second ground contact load per unit time when decreasing that difference to the second load difference $\Delta$F2 is smaller than the magnitude of change amount of the difference between the first ground contact load and the second ground contact load per unit time when increasing that difference to the first load difference $\Delta$F1. That is, the 4WD ECU 60 changes the rotation angle $\theta$ of the stabilizer device 90 in such a manner that the magnitude KB2 of change amount of the rotation angle $\theta$ per unit time when increasing the rotation angle $\theta$ to "−B1+$\Delta$B" becomes smaller than the magnitude KB1 of change amount of the rotation angle $\theta$ per unit time when decreasing the rotation angle $\theta$ to "−B1".

In some embodiments, the 4WD ECU 60 may be configured to change the coupling torques CuRL and CuRR in such a manner that the magnitude KA2 of change amount of each of the coupling torques CuRL and CuRR per unit time when decreasing the coupling torques CuRL and CuRR to "A− $\Delta$A" becomes smaller than the magnitude KA1 of change amount of each of the coupling torques CuRL and CuRR per unit time when increasing the coupling torques CuRL and CuRR to "A".

<Operation of First Apparatus>

Next, an operation of the CPU of the 4WD ECU 60 (hereinafter, simply referred to as the "CPU") will be described. The CPU is configured or programmed to execute a "specific control execution routine" of FIG. 6 shown by a flowchart every time a predetermined period of time elapses.

Figure 6:
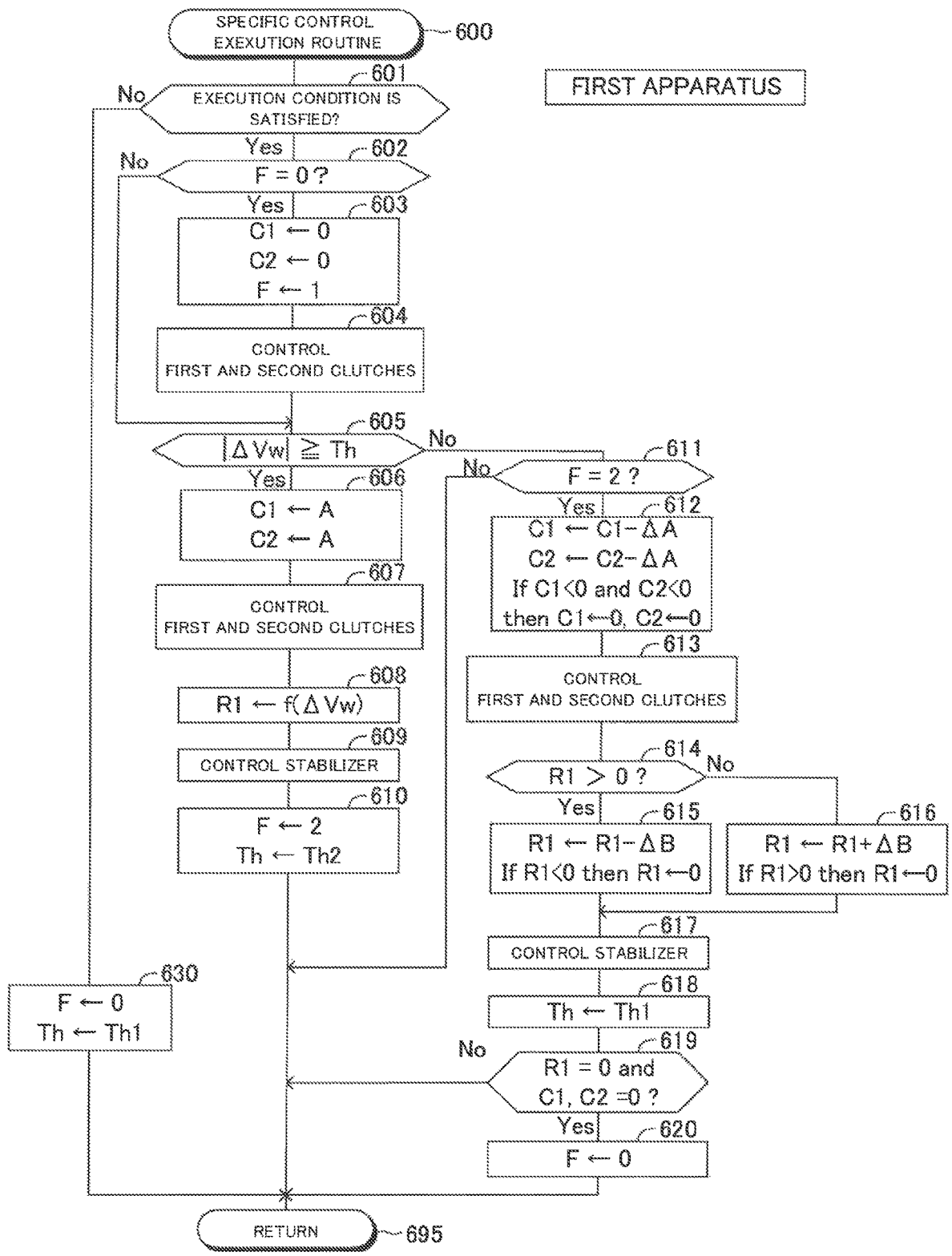
FIG. 6 is a flowchart for illustrating a "specific control execution routine" executed by the 4WD ECU according to the first embodiment.

As a predetermined timing arrives, the CPU starts the routine of FIG. 6 from Step 600, and proceeds to Step 601 to determine whether or not a predetermined execution condition is satisfied.

The predetermined execution condition is satisfied when all of the following conditions 1 to 3 are satisfied.

(condition 1): The vehicle 10 is in the 2WD state (that is, the disconnect mechanism is in the disconnection state).

(condition 2): The vehicle 10 goes substantially straight ahead (that is, the following Expression is satisfied: |St|<δo). "St" is the steering angle of the steering wheel 84a, and "δo" is a predetermined angle.

(condition 3): The braking force is applied to the front wheels (WFL and WFR) and the rear wheels (WRL and WRR) by the braking device 40. That is, the master cylinder pressure Pm is higher than a predetermined value (for example, zero). Alternatively, a brake switch (not shown) may be used. The brake switch is configured to generate/output an on-signal when the brake pedal 41 is operated by the driver. In this configuration, the CPU determines whether or not the brake switch generates/outputs the on-signal. When the brake switch generates/outputs the on-signal, the CPU determines that the condition 3 is satisfied.

When the execution condition is not satisfied, the CPU makes a "No" determination at Step 601, and then, proceeds directly to Step 630. At Step 630, the CPU sets a flag F to "0", and sets a threshold Th to the first threshold Th1. Next, the CPU proceeds to Step 695 to tentatively terminate the present routine. The flag F is set as follows. Immediately after the state in which the execution condition is not satisfied is changed to a state in which the execution condition is satisfied, the first clutch 361 and the second clutch 362 are set to the second state (the state in which the coupling torques of the clutches are both zero) by executing the present routine (see Step 603). At that time point, the flag F is set to "1" (see Step 603). Furthermore, in executing the present routine, when the transition of the first clutch 361 and the second clutch 362 to the first state (the state in which the coupling torques of the clutches both are set to a value larger than zero) is started and the control of the stabilizer device 90 is started, the flag F is set to "2" (see Step 610). In addition, the flag F is set to "0" at a time point at which the specific control is terminated (see Step 620).

Meanwhile, when the execution condition is satisfied, the CPU makes a "Yes" determination at Step 601, and proceeds to Step 602 to determine whether or not the flag F is "0".

Now, it is assumed that the flag F is "0". In this case, the CPU makes a "Yes" determination at Step 602, and proceeds to Step 603. At Step 603, the CPU sets both of the instruction value C1 of the first coupling torque CuRL of the first clutch 361 and the instruction value C2 of the second coupling torque CuRR of the second clutch 362 to "0". Further, the CPU sets the flag F to "1". Next, at Step 604, the CPU controls the first coupling torque CuRL of the first clutch 361 based on the instruction value C1, and controls the second coupling torque CuRR of the second clutch 362 based on the instruction value C2. That is, the CPU changes/transits the first clutch 361 and the second clutch 362 to the second state. Next, the CPU proceeds to Step 605.

At Step 605, the CPU determines whether or not absolute value of the difference ΔVw is equal to or larger than the threshold Th. At this time point, the threshold Th is equal to the first threshold Th1. Now, it is assumed that the degree of the deflection of the vehicle 10 is small. In this case, the CPU makes a "No" determination at Step 605, and proceeds to Step 611. Next, at Step 611, the CPU determines whether or not the flag F is "2". The flag F is now "1". Therefore, the CPU makes a "No" determination at Step 611, and proceeds to Step 695 to tentatively terminate the present routine.

Thereafter, while the above situation (in which the execution condition is satisfied and the degree of the deflection of the vehicle 10 is small) continues, the CPU makes a "No" determination at Step 602 following Step 601, proceeds to Step 605, and then proceeds directly to Step 695 through Step 611. Those processes are repeated in the situation in which the execution condition is satisfied and the degree of the deflection of the vehicle 10 is small. In this situation, it is now assumed that the degree of the deflection of the vehicle 10 with respect to the traveling direction X becomes large, and therefore, the absolute value of the difference ΔVw becomes equal to or larger than the threshold Th. In this case, when proceeding to Step 605, the CPU makes a "Yes" determination. Thereafter, the CPU sequentially executes the following processes of Steps 606 to 610, and thereafter, proceeds to Step 695 to tentatively terminate the present routine.

Step 606: The CPU sets the instruction value C1 of the first coupling torque CuRL of the first clutch 361 and the instruction value C2 of the second coupling torque CuRR of the second clutch 362 to the predetermined torque value A.

Step 607: The CPU controls the first coupling torque CuRL of the first clutch 361 based on the instruction value C1, and controls the second coupling torque CuRR of the second clutch 362 based on the instruction value C2. Specifically, the CPU gradually increases the first coupling torque CuRL of the first clutch 361 and the second coupling torque CuRR of the second clutch 362 in such a manner that the first coupling torque CuRL and the second coupling torque CuRR become equal to the predetermined torque value A. In this control, the magnitude of change amount of each of the coupling torques CuRL and CuRR per unit time is "KA1".

Step 608: The CPU determines the instruction value R1 of the rotation angle θ of the stabilizer device 90 through substituting the difference ΔVw into the variable x in the function f1(x).

Step 609: The CPU controls the rotation angle θ of the stabilizer device 90 based on the instruction value R1. Specifically, the CPU gradually increases or decreases the rotation angle θ of the stabilizer device 90 in such a manner that the rotation angle θ becomes equal to the instruction value R1. In this control, the magnitude of change amount of the rotation angle θ per unit time is "KB1".

Step 610: The CPU sets the flag F to "2". Further, the CPU sets the threshold Th to the second threshold Th2. As described above, the second threshold Th2 is a value smaller than the first threshold Th1.

Thereafter, as the CPU starts the present routine, the CPU makes a "Yes" determination at Step 601, makes a "No" determination at Step 602, and determines whether or not the absolute value of the difference ΔVw is equal to or larger than the threshold Th at Step 605. At this time point, the threshold Th is equal to the second threshold Th2. Therefore, as long as the absolute value of the difference ΔVw is equal to or larger than the second threshold Th2, the processes of Steps 606 to 610 are repeated.

As the above-mentioned processes are repeated, the degree of the yaw movement of the vehicle 10 becomes smaller, and therefore, the vehicle 10 gradually faces in the original traveling direction X (traveling direction before the deflection). Therefore, the absolute value of the difference ΔVw becomes smaller than the second threshold Th2. When the CPU again proceeds to Step 605 in this situation, the CPU makes a "No" determination at Step 605, and proceeds to Step 611. That is, at Step 605, the CPU determines that the degree of the yaw movement for deflecting the vehicle 10 is suppressed (decreased) to the second degree.

Since the flag F is now "2", the CPU makes a "Yes" determination at Step 611, and sequentially executes the following processes of Steps 612 and 613, and thereafter, the CPU proceeds to Step 614.

Step 612: The CPU subtracts the amount of reduction ΔA of the coupling torque from the current instruction value C1 to obtain a value "C1− ΔA", and updates the instruction value C1 to the obtained value "C1− ΔA". Further, the CPU subtracts the amount of reduction ΔA of the coupling torque from the current instruction value C2 to obtain a value "C2−ΔA", and updates the instruction value C2 to the obtained value "C2−ΔA". When the obtained instruction values C1 and C2 are equal to or smaller than "0", the CPU sets the instruction values C1 and C2 to "0".

Step 613: The CPU controls the first coupling torque CuRL of the first clutch 361 based on the instruction value C1, and controls the second coupling torque CuRR of the second clutch 362 based on the instruction value C2. Specifically, the CPU gradually decreases the first coupling torque CuRL of the first clutch 361 in such a manner that the magnitude of change amount of the first coupling torque CuRL per unit time is "KA2". In this manner, the CPU gradually decreases the first coupling torque CuRL to the instruction value C1. Further, the CPU gradually decreases the second coupling torque CuRR of the second clutch 362 in such a manner that the magnitude of change amount of the second coupling torque CuRR per unit time is "KA2". In this manner, the CPU gradually decreases the second coupling torque CuRR to the instruction value C2.

When the CPU proceeds to Step 614, the CPU determines whether or not the current instruction value R1 of the rotation angle θ of the stabilizer device 90 is larger than "0". When the current instruction value R1 is larger than "0", the CPU makes a "Yes" determination at Step 614, and sequentially executes the following processes of Steps 615, 617 and 618. Thereafter, the CPU proceeds to Step 619.

Step 615: The CPU subtracts the amount of change ΔB of the rotation angle θ of the stabilizer device 90 from the current instruction value R1 to obtain a value "R1−ΔB", and updates the instruction value R1 to the obtained value "R1−ΔB". When the instruction value R1 becomes smaller than "0", the CPU sets the instruction value R1 to "0". Further, when the instruction values C1 and C2 are equal to "0", the CPU may set the instruction value R1 to "0".

Step 617: The CPU controls the rotation angle θ of the stabilizer device 90 based on the instruction value R1. Specifically, the CPU gradually decreases the rotation angle θ of the stabilizer device 90 in such a manner that the rotation angle θ becomes equal to the instruction value R1. In this control, the magnitude of change amount of the rotation angle θ of the stabilizer device 90 per unit time is "KB2".

Step 618: The CPU sets the threshold Th to the first threshold Th1.

When the CPU proceeds to Step 619, the CPU determines whether or not a flag reset condition is satisfied. The flag reset condition is satisfied when the instruction value R1 of the rotation angle θ of the stabilizer device 90 is "0", and the instruction value C1 of the first coupling torque CuRL and the instruction value C2 of the second coupling torque CuRR are both "0". When the flag reset condition is satisfied, the CPU makes a "Yes" determination at Step 619, and proceeds to Step 620. The CPU sets the flag F to "0" at Step 620, and proceeds to Step 695 to tentatively terminate the present routine. On the other hand, when the flag reset condition is not satisfied, the CPU makes a "No" determination at Step 619, and proceeds directly to Step 695 to tentatively terminate the present routine.

Meanwhile, when the current instruction value R1 is not larger than "0" at Step 614, the CPU makes a "No" determination, and sequentially executes the following processes of Steps 616, 617 and 618. Thereafter, the CPU proceeds to Step 619.

Step 616: The CPU adds the amount of change ΔB of the rotation angle θ of the stabilizer device 90 to the current instruction value R1 to obtain a value "R1+ΔB", and updates the instruction value R1 to the obtained value "R1+ΔB". When the instruction value R1 becomes larger than "0", the CPU sets the instruction value R1 to "0". Further, when the instruction values C1 and C2 are equal to "0", the CPU may set the instruction value R1 to "0".

Step 617: The CPU controls the rotation angle θ of the stabilizer device 90 based on the instruction value R1. Specifically, the CPU gradually increases the rotation angle θ of the stabilizer device 90 in such a manner that the rotation angle θ becomes equal to the instruction value R1. In this control, the magnitude of change amount of the rotation angle θ of the stabilizer device 90 per unit time is "KB2".

Step 618: The CPU sets the threshold Th to the first threshold Th1.

When the CPU proceeds to Step 619, the CPU determines whether or not the flag reset condition is satisfied. When the flag reset condition is satisfied, the CPU makes a "Yes" determination at Step 619, and proceeds to Step 620. The CPU sets the flag F to "0" at Step 620, and proceeds to Step 695 to tentatively terminate the present routine. On the other hand, when the flag reset condition is not satisfied, the CPU makes a "No" determination at Step 619, and proceeds directly to Step 695 to tentatively terminate the present routine.

By the above-mentioned series of processes, the CPU can generate, in the vehicle 10, the yaw moment in the direction opposite to the yaw movement to thereby return the traveling direction of the vehicle 10 to the original traveling direction X before the deflection.

As described above, in the situation in which the vehicle 10 is traveling substantially straight in the 2WD state (that is, the disconnect mechanism is in the disconnection state) and the braking force is being applied to the wheels (WFL, WFR, WRL and WRR), when the degree of the yaw movement for deflecting the vehicle 10 to the left or right side due to the braking force becomes large, the first apparatus performs the above-mentioned specific control. That is, the first apparatus starts the specific control by increasing both of the first coupling torque CuRL and the second coupling torque CuRR to the "torque value A (first torque value) which is larger than zero". In this manner, since the difference ΔVw between the wheel speed Vwrr of the right rear wheel WRR and the wheel speed Vwrl of the left rear wheel WRL is gradually decreased, a further deflection of the vehicle 10 can be suppressed. In parallel with the above control, when starting the specific control, the first apparatus gradually increases or decreases the rotation angle θ of the stabilizer device 90 in such a manner that the ground contact load (first ground contact load) of the wheel at the outer side with respect to (relative to) the yaw movement becomes larger than the ground contact load (second ground contact load) of the wheel at the inner side with respect to (relative to) the yaw movement. When the first ground contact load exceeds the second ground contact load by the predetermined first load difference ΔF1 or more, the braking force received from the road surface by the rear wheel having a relatively large ground contact load becomes significantly larger than the braking force received from the road surface by the rear wheel having a relatively small ground contact load. As a result, in the vehicle 10, a yaw moment occurs in the direction such that the rear wheel of which the braking force received from the road surface is larger is the inner side wheel. That is, in the vehicle 10, the yaw moment can be generated in the direction opposite to the yaw movement. Therefore, by this yaw moment, the first apparatus can return the traveling direction of the vehicle 10 to the original traveling direction X which is the traveling direction of the vehicle before the deflection occurred. Further, since the first apparatus performs the specific control without switching to the four-wheel-drive state (4WD state), the fuel consumption is not degraded. Further, since the first apparatus controls the stabilizer device 90 at the rear wheel side which is away from a driver's seat, the first apparatus can reduce a possibility that the driver feels discomfort during braking of the vehicle 10.

Second Embodiment

Figure 7:
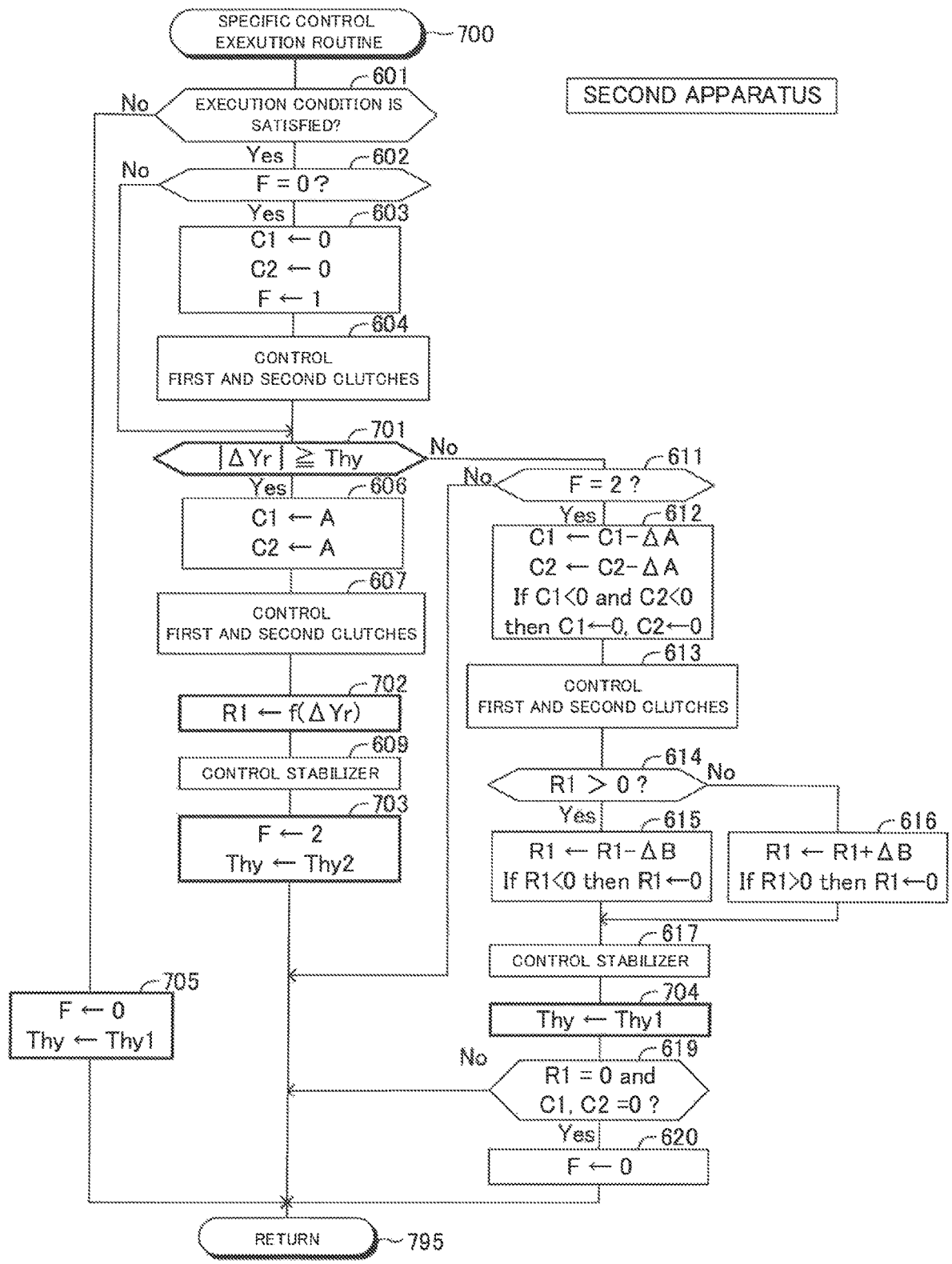
FIG. 7 is a flowchart for illustrating a "specific control execution routine" executed by the 4WD ECU according to a second embodiment.

Next, a control apparatus for a four-wheel-drive vehicle (hereinafter, referred to as a "second apparatus") according to a second embodiment will be described. The second apparatus is different from the first apparatus in that the second apparatus determines whether or not the degree of the deflection of the vehicle 10 is larger than the predetermined degree through using (or based on) the yaw rate. The second apparatus is different from the first apparatus in that the CPU of the second apparatus executes a "specific control execution routine of FIG. 7 shown by a flowchart in place of the routine of FIG. 6". Hereinafter, this difference will be mainly described.

The CPU is configured or programmed to execute the specific control execution routine shown in FIG. 7 in place of the routine of FIG. 6 every time the predetermined period of time elapses. The routine shown in FIG. 7 is a routine in which Steps 605, 608, 610, 618 and 630 of the routine in FIG. 6 are replaced with Steps 701 to 705, respectively. In FIG. 7, for each step for executing the same process as the step shown in FIG. 6, the same reference numeral in FIG. 6 is appended. Therefore, detailed descriptions of Steps in FIG. 7 denoted by the same reference numerals as in FIG. 6 will be omitted.

The CPU starts the routine of FIG. 7 from Step 700 at a predetermined timing. When the execution condition is not satisfied, the CPU makes a "No" determination at Step 601, and proceeds to Step 705. At Step 705, the CPU sets the flag F to "0", and sets a threshold (threshold for yaw rate) Thy to a first yaw rate threshold Thy1. The first yaw rate threshold Thy1 is a threshold for determining whether or not the degree of the yaw movement is larger than the first degree. Next, the CPU proceeds to Step 795 to tentatively terminate the present routine.

When the CPU starts the routine of FIG. 7 from Step 700 at the predetermined timing after a state in which the execution condition is not satisfied is changed to a state in which the execution condition is satisfied, the CPU makes a "Yes" determination at Step 601, and executes the processes of Steps 602 to 604. Thereafter, the CPU proceeds to Step 701.

The CPU executes a routine (not shown) to store in advance a "yaw rate at the start of the application of the braking force (that is, braking force which has been applied to the wheels (WFL, WFR, WRL and WRR) up to the present time)" in the RAM as an initial yaw rate Yr0. That is, the CPU stores in the RAM the yaw rate detected by the yaw rate sensor 85 at the time point at which the application of the braking force was started. It should be noted that the initial yaw rate Yr0 may be always set to "0". At Step 701, the CPU calculates a difference ΔYr (=Yr1−Yr0) between the yaw rate Yr1 detected by the yaw rate sensor 85 at the current time point and the initial yaw rate Yr0 at the start of the application of the braking force. Further, at Step 701, the CPU determines whether or not the absolute value of the difference ΔYr is equal to or larger than the threshold Th (=the first yaw rate threshold Thy1). When the absolute value of the difference ΔYr is equal to or larger than the first yaw rate threshold Thy1, the CPU makes a "Yes" determination at Step 701, and sequentially executes the processes of Step 606 and Step 607. Thereafter, the CPU proceeds to Step 702.

Figure 8:
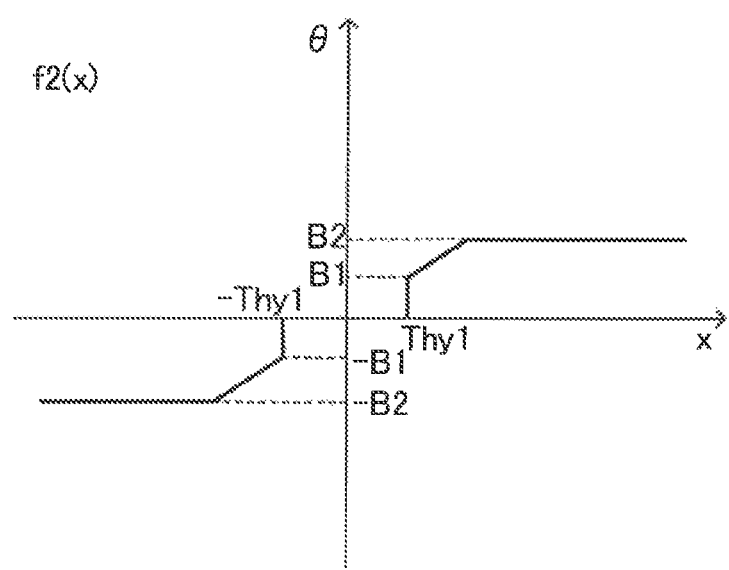
FIG. 8 is a graph of a function f2(x) representing a relationship between (i) a difference ΔYr (=Yr1−Yr0) between a yaw rate Yr1 at the current time point and a yaw rate Yr0 at a time point at which application of a braking force to each wheel is started, and (ii) the instruction value of the rotation angle θ of the stabilizer device.

At Step 702, the CPU determines the instruction value R1 of the rotation angle θ of the stabilizer device 90 by substituting the difference ΔYr into a variable x in a function f2(x) shown in FIG. 8. The function f2(x) is a function representing a relationship between the difference ΔYr and the rotation angle θ of the stabilizer device 90. As shown in FIG. 8, when the difference ΔYr is equal to or larger than the first yaw rate threshold Thy1, since the vehicle 10 is deflected to the left side, the instruction value R1 of the rotation angle θ of the stabilizer device 90 is set to a positive value. That is, the instruction value R1 of the rotation angle θ of the stabilizer device 90 is set in such manner that the ground contact load at the right rear wheel WRR at the outer side with respect to the direction of the yaw movement becomes larger than the ground contact load at the left rear wheel WRL at the inner side with respect to the direction of the yaw movement. Meanwhile, when the difference ΔYr is equal to or smaller than "−Thy1", since the vehicle 10 is deflected to the right side, the instruction value R1 of the rotation angle θ of the stabilizer device 90 is set to a negative value. That is, the instruction value R1 of the rotation angle θ of the stabilizer device 90 is set in such manner that the ground contact load at the left rear wheel WRL at the outer side with respect to the direction of the yaw movement becomes larger than the ground contact load at the right rear wheel WRR at the inner side with respect to the direction of the yaw movement.

Next, the CPU executes the process of Step 609 based on the instruction value R1 of the rotation angle θ of the stabilizer device 90 determined at Step 702, and proceeds to Step 703. At Step 703, the CPU sets the flag F to "2". Further, the CPU sets the threshold Thy to a second yaw rate threshold Thy2. Thy2 is a threshold for determining whether or not the degree of the yaw movement is suppressed/decreased to the second degree which is smaller than the first degree.

Thereafter, as the CPU starts the present routine from Step 700, the CPU makes a "Yes" determination at Step 601, makes a "No" determination at Step 602, and then, at Step 701, determines whether or not the absolute value of the difference ΔYr is equal to or larger than the threshold Thy which is equal to the second yaw rate threshold Thy2. In this manner, as long as the absolute value of the difference ΔYr is equal to or larger than the second yaw rate threshold Thy2, the CPU repeatedly executes the processes of Step 606, Step 607, Step 702, Step 609 and Step 703.

As the above-mentioned processes are repeated, the degree of the yaw movement of the vehicle 10 becomes smaller, and therefore, the vehicle 10 gradually faces in the original traveling direction X (traveling direction before the deflection). Therefore, the absolute value of the difference ΔYr becomes smaller than the second yaw rate threshold Thy2. When the CPU again proceeds to Step 701 in this situation, the CPU makes a "No" determination at Step 701 and proceeds to Step 611. That is, at Step 701, the CPU determines that the degree of the yaw movement for deflecting the vehicle 10 is suppressed (decreased) to the second degree.

Since the flag F is "2" at the present time, the CPU makes a "Yes" determination at Step 611, and sequentially executes the processes of Steps 612 to 617. Next, the CPU proceeds to Step 704. At Step 704, the CPU sets the threshold Thy to the first yaw rate threshold Thy1, and proceeds to Step 619.

Next, when the flag reset condition is satisfied, the CPU makes a "Yes" determination at Step 619, and executes the process of Step 620. Thereafter, the CPU proceeds to Step 795 to tentatively terminate the present routine. Meanwhile, when the flag reset condition is not satisfied, the CPU makes a "No" determination at Step 619, and proceeds directly to Step 795 to tentatively terminate the present routine.

As described above, based on the yaw rate, the second apparatus determines whether or not the degree of the yaw movement for deflecting the vehicle 10 to the left or right side becomes large during braking of the vehicle 10. When the second apparatus determines that the degree of the yaw movement for deflecting the vehicle 10 to the left or right side becomes larger than a predetermined degree (first degree) during braking of the vehicle 10, the second apparatus performs the specific control in the same manner as the first apparatus. Therefore, in the vehicle 10, the second apparatus can generate the yaw moment in the direction opposite to the yaw movement. Accordingly, the vehicle 10 can be made to face in the original traveling direction X which is the traveling direction of the vehicle before the deflection occurred.

The present disclosure is not limited to the above-mentioned embodiments, and various changes can be adopted within the scope of the present disclosure.

The suspension part 93L of the left rear wheel WRL and the suspension part 93R of the right rear wheel WRR may be active suspension devices, respectively. The active suspension device includes a hydraulic cylinder configured to generate a force by hydraulic pressure. The vehicle 10 includes a hydraulic pressure driving unit, and the active suspension device is configured to change an amount of displacement of the suspension and the ground contact load at each wheel by controlling the hydraulic pressure driving unit. In this configuration, the first apparatus and the second apparatus may adopt the active suspension devices as a ground contact load adjusting device configured to cause a difference between the ground contact load at the left rear wheel WRL and the ground contact load at the right rear wheel WRR, in place of or in addition to the stabilizer device 90. According to the present modification, when the degree of the yaw movement for deflecting the vehicle 10 to the left or right side becomes larger than the first degree, the 4WD ECU 60 controls the hydraulic pressure driving unit to independently control the active suspension device (hereinafter, referred to as a "first active suspension device") corresponding to the left rear wheel WRL and the active suspension device (hereinafter, referred to as a "second active suspension device") corresponding to the right rear wheel WRR. That is, the 4WD ECU 60 controls the first active suspension device and the second active suspension device in such a manner that the ground contact load (first ground contact load) of the wheel at the outer side with respect to the yaw movement becomes larger than the ground contact load (second ground contact load) of the wheel at the inner side with respect to the yaw movement by the predetermined first load difference ΔF1 or more. Therefore, in vehicle 10, the yaw moment can be generated in the direction opposite to the yaw movement. Further, when the degree of the yaw movement is suppressed to the second degree, the 4WD ECU 60 controls the first active suspension device and the second active suspension device in such a manner that the difference between the first ground contact load and the second ground contact load is decreased to the second load difference ΔF2 which is equal to or larger than zero, and is smaller than the first load difference.

In the above-mentioned modified configuration as well, the 4WD ECU 60 may be configured to control the first active suspension device and the second active suspension device in such a manner that the "magnitude of change amount of the difference between the first ground contact load and the second ground contact load per unit time when decreasing that difference to the second load difference ΔF2" becomes smaller than the "magnitude of change amount of the difference between the first ground contact load and the second ground contact load per unit time when increasing that difference to the first load difference ΔF1".

Figure 5:
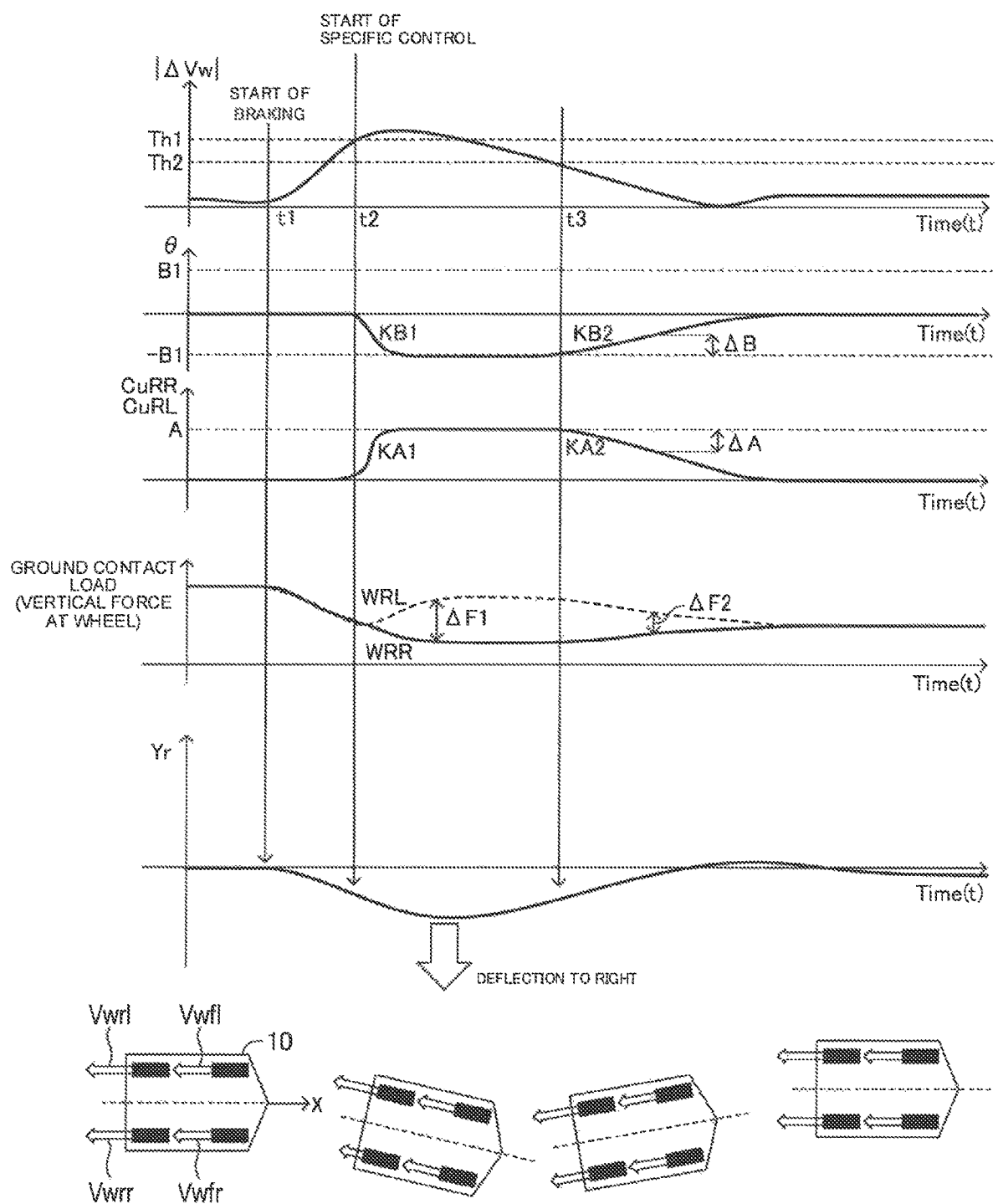
FIG. 5 is a diagram for explaining an operation of the 4WD ECU according to the first embodiment in a case where the vehicle is deflected to the right side.

As illustrated in FIGS. 2 and 5, the 4WD ECU 60 of the first apparatus starts the process for decreasing the first coupling torque CuRL and the second coupling torque CuRR at the time point (time t3 in FIGS. 2 and 5) at which the 4WD ECU 60 determines that the degree of the yaw movement is decreased (suppressed) to the predetermined second degree. Hereinafter, such a process is referred to as a "coupling torque decreasing process". However, the control apparatus according to the present disclosure may start the coupling torque decreasing process at any time point on and after it is determined that the degree of the yaw movement is suppressed to the predetermined second degree. For example, the control apparatus may start the coupling torque decreasing process from a time point at which the absolute value of the difference ΔVw is decreased to zero or a value close to zero.

The first clutch 361 and the second clutch 362 are not limited to the combination of the multiple disk type clutch and the electromagnetic clutch, respectively. The first clutch 361 and the second clutch 362 may be configured by any one of the multiple disk type clutch and the electromagnetic clutch, respectively.

The magnitude KA2 of change amount of the coupling torque per unit time may be equal to the magnitude KA1 of change amount of the coupling torque per unit time. The magnitude KB2 of change amount of the rotation angle θ per unit time may be equal to the magnitude KB1 of change amount of the rotation angle θ per unit.

The number of the clutches constituting the disconnect mechanism and the positions of those clutches are not limited to the example illustrated in FIG. 1. The vehicle 10 may include, as the disconnect mechanism, one or more clutches configured to selectively transmit or interrupt the driving force of the driving device 20 at one or more positions between the driving device 20 and the rear wheel final gear device 35. For example, a clutch may be provided at any position of the propeller shaft 34.

Furthermore, both of the first apparatus and the second apparatus are configured to perform the specific control only when the vehicle is traveling substantially straight ahead (see the above-mentioned condition 2). However, the control apparatus may be configured to perform the specific control even when the absolute value of the steering angle St of the steering wheel 84a is equal to or larger than a threshold δo. In this configuration, the control apparatus extrapolates a yaw rate to be generated in the vehicle 10 based on the steering angle St, the vehicle speed and the like. When an actual yaw rate during braking deviates from the extrapolated yaw rate by a predetermined value or more, the control apparatus determines that the degree of the yaw movement for deflecting the vehicle 10 to the left or right side due to the braking force becomes larger than the first degree, and performs the above-mentioned specific control.

The second apparatus may calculate (extrapolate) the value of the yaw rate based on the vehicle speed, the steering angle, the lateral acceleration Gy, and the like. Further, the first apparatus and the second apparatus may be combined. That is, the control apparatus according to the present modification may determine whether to start the specific control by using both of the difference ΔVw and the difference ΔYr.

What is claimed is:

1. A control apparatus for a four-wheel-drive vehicle comprising:
    a driving device configured to generate a driving force;
    a braking device configured to apply a braking force to a left front wheel, a right front wheel, a left rear wheel, and a right rear wheel;
    a front wheel differential device configured to transmit the driving force to a left front wheel axle and a right front wheel axle, and allow a differential between the left front wheel axle and the right front wheel axle;
    a transfer gear device configured to transmit the driving force to a propeller shaft;
    a rear wheel final gear device having a driving output part, and configured to transmit to the driving output part the driving force transmitted to the propeller shaft;
    a first coupling device configured to control a first coupling torque between the driving output part and a left rear wheel axle to change a transmission degree of the driving force to the left rear wheel axle;
    a second coupling device configured to control a second coupling torque between the driving output part and a right rear wheel axle to change a transmission degree of the driving force to the right rear wheel axle;
    a mechanism configured to selectively set a transmission state of the driving force transmitted from the driving device to the driving output part through the transfer gear device and the propeller shaft to either a connection state in which the driving force is transmitted to the driving output part, or a disconnection state in which the driving force is not transmitted to the driving output part; and
    a ground contact load adjusting device configured to cause a difference between a ground contact load at the left rear wheel and a ground contact load at the right rear wheel,
    a detector configured to detect traveling state information indicative of a current traveling state of the vehicle; and
    a controller configured to, based on the traveling state information detected by the detector, control the first coupling torque and the second coupling torque, and control the ground contact load adjusting device,
    wherein, in a case where the four-wheel-drive vehicle travels in a two-wheel-drive state of the left front wheel and the right front wheel through setting the transmission state of the driving force to the disconnection state, when the braking device applies the braking force to the left front wheel, the right front wheel, the left rear wheel, and the right rear wheel, and the first coupling torque and the second coupling torque are both zero, the controller is configured to:
    based on the traveling state information detected by the detector, determine whether or not a degree of a yaw movement for deflecting the vehicle to a left or right side due to the braking force is larger than a predetermined first degree;
    when the controller determines that the degree of the yaw movement is larger than the first degree, perform a yaw movement suppression control;
    determine, based on the traveling state information, whether or not the degree of the yaw movement is decreased to a predetermined second degree which is smaller than the first degree and larger than zero during the yaw movement suppression control;
    on and after the controller determines that the degree of the yaw movement is decreased to the second degree, gradually decrease a difference between the first ground contact load and the second ground contact load to zero; and
    change the difference between the first ground contact load and the second ground contact load in such a manner that a magnitude of change amount of the difference per unit time when gradually decreasing the difference to zero is smaller than a magnitude of change amount of the difference per unit time when increasing the difference to the first load difference,
    wherein the yaw movement suppression control is a control to:
    increase the first coupling torque and the second coupling torque to a predetermined first torque value which is larger than zero while maintaining the transmission state of the driving force at the disconnection state; and
    control the ground contact load adjusting device in such a manner that a first ground contact load at the rear wheel at an outer side with respect to the yaw movement becomes larger than a second ground contact load at the rear wheel at an inner side with respect to the yaw movement by a predetermined first load difference or more.

2. The control apparatus for the four-wheel-drive vehicle according to claim 1, wherein the controller is configured to gradually decrease the first coupling torque and the second coupling torque to zero on and after the controller determines that the degree of the yaw movement is decreased to the second degree, and
    wherein the controller is further configured to change the first coupling torque and the second coupling torque in such a manner that a magnitude of change amount of each coupling torque per unit time when gradually decreasing the first coupling torque and the second coupling torque to zero is smaller than a magnitude of change amount of each coupling torque per unit time when increasing the first coupling torque and the second coupling torque to the first torque value.

* * * * *

UNITED STATES PATENT AND TRADEMARK OFFICE
CERTIFICATE OF CORRECTION

PATENT NO. : 10,906,529 B2
APPLICATION NO. : 16/227051
DATED : February 2, 2021
INVENTOR(S) : Ryochi Watanabe It is certified that error appears in the above-identified patent and that said Letters Patent is hereby corrected as shown below:

In the Specification

In Column 10, Line(s) 38, delete ""w"" and insert --"ω"--, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*